(12) United States Patent
Frazier et al.

(10) Patent No.: US 9,587,475 B2
(45) Date of Patent: Mar. 7, 2017

(54) DOWNHOLE TOOLS HAVING NON-TOXIC DEGRADABLE ELEMENTS AND THEIR METHODS OF USE

(71) Applicant: Frazier Ball Invention, LLC, Corpus Christi, TX (US)

(72) Inventors: W. Lynn Frazier, Corpus Christi, TX (US); Garrett Frazier, Corpus Christi, TX (US); Derrick Frazier, Corpus Christi, TX (US)

( * ) Notice: Subject to any disclaimer, the term of this patent is extended or adjusted under 35 U.S.C. 154(b) by 351 days.

(21) Appl. No.: 13/895,707

(22) Filed: May 16, 2013

(65) Prior Publication Data

US 2014/0076571 A1    Mar. 20, 2014

Related U.S. Application Data

(63) Continuation-in-part of application No. 13/894,649, filed on May 15, 2013, now Pat. No. 9,217,319, which is a continuation of application No. 13/843,051, filed on Mar. 15, 2013, now abandoned.

(60) Provisional application No. 61/648,749, filed on May 18, 2012, provisional application No. 61/738,519, filed on Dec. 18, 2012.

(51) Int. Cl.
*E21B 29/02*    (2006.01)
*E21B 43/26*    (2006.01)
*B29C 47/00*    (2006.01)

(52) U.S. Cl.
CPC ........ *E21B 43/261* (2013.01); *B29C 47/0066* (2013.01); *E21B 43/26* (2013.01)

(58) Field of Classification Search
CPC ............................ E21B 29/02; E21B 33/1208
See application file for complete search history.

(56) References Cited

U.S. PATENT DOCUMENTS

| | | |
|---|---|---|
| RE17,217 E | 2/1929 | Burch |
| 2,040,889 A | 5/1936 | Whinnen |
| 2,160,228 A | 5/1939 | Pustmueller |
| 2,223,602 A | 12/1940 | Cox |
| 2,230,447 A | 2/1941 | Bassinger |
| 2,286,126 A | 6/1942 | Thornhill |
| 2,331,532 A | 10/1943 | Bassinger |
| 2,555,627 A | 6/1951 | Baker |
| 2,589,506 A | 3/1952 | Morrisett |
| 2,593,520 A | 4/1952 | Baker |
| 2,616,502 A | 11/1952 | Lenz |
| 2,640,546 A | 6/1953 | Baker |
| 2,713,910 A | 7/1955 | Baker |
| 2,833,354 A | 5/1956 | Sailers |
| 2,830,666 A | 4/1958 | Rhodes |
| 3,013,612 A | 12/1961 | Angel |
| 3,054,453 A | 9/1962 | Bonner |
| 3,062,296 A | 11/1962 | Brown |

(Continued)

FOREIGN PATENT DOCUMENTS

| | | |
|---|---|---|
| GB | 914030 | 12/1962 |
| WO | 2010127457 | 11/2010 |

*Primary Examiner* — Catherine Loikith

(57) ABSTRACT

Downhole tools for use in oil and gas production which degrade into non-toxic materials, a method of making them and methods of using them. A frac ball and a bridge plug comprised of polyglycolic acid which can be used in fracking a well and then left in the well bore to predictably, quickly, and safely disintegrate into environmentally friendly products without needing to be milled out or retrieved.

25 Claims, 22 Drawing Sheets

(56) References Cited

U.S. PATENT DOCUMENTS

| | | |
|---|---|---|
| 3,163,225 A | 12/1964 | Perkins |
| 3,273,588 A | 9/1966 | Dollison |
| 3,298,437 A | 1/1967 | Conrad |
| 3,298,440 A | 1/1967 | Current |
| 3,306,362 A | 2/1967 | Urbanosky |
| 3,308,895 A | 3/1967 | Oxford |
| 3,356,140 A | 12/1967 | Young |
| 3,517,742 A | 6/1970 | Williams |
| 3,623,551 A | 11/1971 | Randermann |
| 3,687,202 A | 8/1972 | Young |
| 3,787,101 A | 1/1974 | Sugden |
| 3,818,987 A | 6/1974 | Ellis |
| 3,851,706 A | 12/1974 | Ellis |
| 3,860,066 A | 1/1975 | Pearce |
| 3,926,253 A | 12/1975 | Duke |
| 4,035,024 A | 7/1977 | Fink |
| 4,049,015 A | 9/1977 | Brown |
| 4,134,455 A | 1/1979 | Read |
| 4,151,875 A | 5/1979 | Bullaway |
| 4,185,689 A | 1/1980 | Harris |
| 4,189,183 A | 2/1980 | Borowski |
| 4,250,960 A | 2/1981 | Chammas |
| 4,314,608 A | 2/1982 | Richardson |
| 4,381,038 A | 4/1983 | Sugden |
| 4,391,547 A | 7/1983 | Jackson |
| 4,405,017 A | 9/1983 | Allen |
| 4,432,418 A | 2/1984 | Mayland |
| 4,436,151 A | 3/1984 | Callihan |
| 4,457,376 A | 7/1984 | Carmody |
| 4,532,995 A | 8/1985 | Kaufman |
| 4,548,442 A | 10/1985 | Sugden |
| 4,554,981 A | 11/1985 | Davies |
| 4,566,541 A | 1/1986 | Moussy |
| 4,585,067 A | 4/1986 | Blizzard |
| 4,595,052 A | 6/1986 | Kristiansen |
| 4,602,654 A | 7/1986 | Stehling |
| 4,688,641 A | 8/1987 | Knieriemen |
| 4,708,163 A | 11/1987 | Deaton |
| D293,798 S | 1/1988 | Johnson |
| 4,776,410 A | 10/1988 | Perkin |
| 4,784,226 A | 11/1988 | Wyatt |
| 4,792,000 A | 12/1988 | Perkin |
| 4,830,103 A | 5/1989 | Blackwell |
| 4,848,459 A | 7/1989 | Blackwell |
| 4,893,678 A | 1/1990 | Stokley |
| 5,020,590 A | 6/1991 | McLeod |
| 5,074,063 A | 12/1991 | Vannette |
| 5,082,061 A | 1/1992 | Dollison |
| 5,095,980 A | 3/1992 | Watson |
| 5,113,940 A | 5/1992 | Glaser |
| 5,117,915 A | 6/1992 | Mueller |
| 5,154,228 A | 10/1992 | Gambertoglio |
| 5,183,068 A | 2/1993 | Prosser |
| 5,188,182 A | 2/1993 | Echols |
| 5,207,274 A | 5/1993 | Streich |
| 5,209,310 A | 5/1993 | Clydesdale |
| 5,219,380 A | 6/1993 | Young |
| 5,230,390 A | 7/1993 | Zastresek |
| 5,234,052 A | 8/1993 | Coone |
| 5,253,705 A | 10/1993 | Clary |
| 5,295,735 A | 3/1994 | Cobbs |
| 5,316,081 A | 5/1994 | Baski |
| 5,318,131 A | 6/1994 | Baker |
| D350,887 S | 9/1994 | Sjolander |
| 5,343,954 A | 9/1994 | Bohlen |
| D353,756 S | 12/1994 | Graves |
| D355,428 S | 2/1995 | Hatcher |
| 5,390,737 A | 2/1995 | Jacobi |
| 5,392,540 A | 2/1995 | Cooper |
| RE35,088 E | 11/1995 | Gilbert |
| 5,484,191 A | 1/1996 | Sollami |
| 5,490,339 A | 2/1996 | Accettola |
| 5,540,279 A | 7/1996 | Branch |
| 5,564,502 A | 10/1996 | Crow |
| 5,593,292 A | 1/1997 | Ivey |
| D377,969 S | 2/1997 | Grantham |
| 5,655,614 A | 8/1997 | Azar |
| 5,701,959 A | 12/1997 | Hushbeck |
| 5,785,135 A | 7/1998 | Crawley |
| 5,791,825 A | 8/1998 | Gardner |
| 5,803,173 A | 9/1998 | Fraser |
| 5,810,083 A | 9/1998 | Kilgore |
| 5,819,846 A | 10/1998 | Bolt |
| D415,180 S | 10/1999 | Rosanwo |
| 5,961,185 A | 10/1999 | Friant |
| 5,984,007 A | 11/1999 | Yuan |
| 5,988,277 A | 11/1999 | Vick |
| 6,012,519 A | 1/2000 | Allen |
| 6,085,446 A | 7/2000 | Posch |
| 6,098,716 A | 8/2000 | Hromas |
| 6,105,694 A | 8/2000 | Scott |
| 6,142,226 A | 11/2000 | Vick |
| 6,152,232 A | 11/2000 | Webb |
| 6,167,963 B1 | 1/2001 | McMahan |
| 6,182,752 B1 | 2/2001 | Smith |
| 6,189,618 B1 | 2/2001 | Beeman et al. |
| 6,199,636 B1 | 3/2001 | Harrison |
| 6,220,349 B1 | 4/2001 | Vargus |
| 6,283,148 B1 | 9/2001 | Spears |
| 6,341,823 B1 | 1/2002 | Sollami |
| 6,367,569 B1 | 4/2002 | Walk |
| 6,394,180 B1 | 5/2002 | Berscheidt |
| 6,457,267 B1 | 10/2002 | Porter |
| 6,491,108 B1 | 12/2002 | Slup |
| 6,543,963 B2 | 4/2003 | Bruso |
| 6,581,681 B1 | 6/2003 | Zimmerman |
| 6,629,563 B2 | 10/2003 | Doane |
| 6,695,049 B2 | 2/2004 | Ostocke |
| 6,725,935 B2 | 4/2004 | Szarka |
| 6,739,398 B1 | 5/2004 | Yokley |
| 6,779,948 B2 | 8/2004 | Bruso |
| 6,799,633 B2 | 10/2004 | McGregor |
| 6,834,717 B2 | 12/2004 | Bland |
| 6,851,489 B2 | 2/2005 | Hinds |
| 6,854,201 B1 | 2/2005 | Hunter |
| 6,902,006 B2 | 6/2005 | Myerley |
| 6,918,439 B2 | 7/2005 | Dallas |
| 6,938,696 B2 | 9/2005 | Dallas |
| 6,944,977 B2 | 9/2005 | Deniau |
| 7,040,410 B2 | 5/2006 | McGuire |
| 7,055,632 B2 | 6/2006 | Dallas |
| 7,069,997 B2 | 7/2006 | Coyes |
| 7,107,875 B2 | 9/2006 | Haugen |
| 7,124,831 B2 | 10/2006 | Turley |
| 7,128,091 B2 | 10/2006 | Istre |
| 7,134,505 B2 | 11/2006 | Fehr et al. |
| 7,150,131 B2 | 12/2006 | Barker |
| 7,168,494 B2 | 1/2007 | Starr |
| 7,281,584 B2 | 10/2007 | McGarian |
| D560,109 S | 1/2008 | Huang |
| 7,325,617 B2 | 2/2008 | Murray |
| 7,337,847 B2 | 3/2008 | McGarian |
| 7,353,879 B2 | 4/2008 | Todd |
| 7,363,967 B2 | 4/2008 | Burris |
| 7,373,973 B2 | 5/2008 | Smith |
| 7,464,764 B2 | 12/2008 | Xu |
| 7,527,104 B2 | 5/2009 | Branch |
| 7,552,779 B2 | 6/2009 | Murray |
| D579,110 S | 7/2009 | Antua |
| 7,600,572 B2 | 10/2009 | Slup |
| 7,604,058 B2 | 10/2009 | McGuire |
| 7,637,326 B2 | 12/2009 | Bolding |
| 7,644,767 B2 | 1/2010 | Kalb |
| 7,644,772 B2 | 1/2010 | Avant et al. |
| 7,644,774 B2 | 1/2010 | Branch |
| 7,647,964 B2 | 1/2010 | Akbar et al. |
| D612,875 S | 3/2010 | Beynon |
| 7,673,677 B2 | 3/2010 | King |
| 7,681,645 B2 | 3/2010 | McMillin et al. |
| D618,715 S | 6/2010 | Corcoran |
| 7,735,549 B1 | 6/2010 | Nish |
| 7,775,278 B2 * | 8/2010 | Willberg .......... C09K 8/508 |
| | | 166/280.1 |
| 7,775,286 B2 | 8/2010 | Duphorne |

(56) References Cited

U.S. PATENT DOCUMENTS

| | | |
|---|---|---|
| 7,775,291 B2 | 8/2010 | Jacob |
| 7,784,550 B2 | 8/2010 | Nutley |
| 7,798,236 B2 | 9/2010 | McKeachnie |
| 7,810,558 B2 | 10/2010 | Shkurti |
| D629,820 S | 12/2010 | Van Ryswyk |
| 7,866,396 B2 | 1/2011 | Rytlewski |
| 7,878,242 B2 | 2/2011 | Gray |
| 7,886,830 B2 | 2/2011 | Bolding |
| 7,900,696 B1 | 3/2011 | Nish |
| 7,909,108 B2 | 3/2011 | Swor |
| 7,909,109 B2 | 3/2011 | Angman |
| D635,429 S | 4/2011 | Hakki |
| 7,918,278 B2 | 4/2011 | Barbee |
| 7,921,923 B2 | 4/2011 | McGuire |
| 7,921,925 B2 | 4/2011 | Maguire et al. |
| 7,926,571 B2 | 4/2011 | Hofman |
| 8,074,718 B2 | 12/2011 | Roberts |
| 8,079,413 B2 | 12/2011 | Frazier |
| 8,113,276 B2 | 2/2012 | Greenlee |
| 8,127,856 B1 | 3/2012 | Nish |
| D657,807 S | 4/2012 | Frazier |
| 8,231,947 B2 | 7/2012 | Vaidya |
| 2001/0040035 A1 | 11/2001 | Appleton |
| 2003/0024706 A1 | 2/2003 | Allamon |
| 2003/0188860 A1 | 10/2003 | Zimmerman |
| 2004/0150533 A1 | 8/2004 | Hall |
| 2005/0173126 A1 | 8/2005 | Starrt |
| 2006/0001283 A1 | 1/2006 | Bakke |
| 2006/0011389 A1 | 1/2006 | Booth |
| 2006/0278405 A1 | 12/2006 | Turley |
| 2007/0051521 A1 | 3/2007 | Fike |
| 2007/0068670 A1 | 3/2007 | Booth |
| 2007/0107908 A1 | 5/2007 | Vaidya |
| 2007/0227745 A1 | 10/2007 | Roberts |
| 2007/0240883 A1 | 10/2007 | Telfer |
| 2008/0110635 A1 | 5/2008 | Loretz |
| 2009/0044957 A1 | 2/2009 | Clayton |
| 2009/0114401 A1 | 5/2009 | Purkis |
| 2009/0126933 A1 | 5/2009 | Telfer |
| 2009/0211749 A1 | 8/2009 | Nguyen |
| 2010/0064859 A1 | 3/2010 | Stephens |
| 2010/0084146 A1 | 4/2010 | Roberts |
| 2010/0101803 A1 | 4/2010 | Clayton et al. |
| 2010/0132960 A1 | 6/2010 | Shkurti |
| 2010/0155050 A1 | 6/2010 | Frazier |
| 2010/0252252 A1 | 10/2010 | Harris |
| 2010/0276159 A1 | 11/2010 | Mailand |
| 2010/0288503 A1 | 11/2010 | Cuiper |
| 2011/0005779 A1 | 1/2011 | Lembcke |
| 2011/0036564 A1 | 2/2011 | Williamson |
| 2011/0061856 A1 | 3/2011 | Kellner |
| 2011/0088915 A1 | 4/2011 | Stanojcic |
| 2011/0103915 A1 | 5/2011 | Tedeschi |
| 2011/0147014 A1* | 6/2011 | Chen ................ E21B 23/04 166/387 |
| 2011/0168404 A1 | 7/2011 | Telfer |
| 2011/0198082 A1 | 8/2011 | Stromquist |
| 2011/0240295 A1 | 10/2011 | Porter |
| 2011/0259610 A1 | 10/2011 | Shkurti |
| 2012/0073819 A1* | 3/2012 | Richard ............. E21B 33/10 166/308.1 |
| 2013/0008666 A1 | 1/2013 | Cherewyk |
| 2013/0008671 A1 | 1/2013 | Booth |
| 2013/0014936 A1 | 1/2013 | Griffith |
| 2013/0068474 A1 | 3/2013 | Hofman et al. |
| 2013/0240200 A1 | 9/2013 | Frazier |
| 2013/0240201 A1 | 9/2013 | Frazier |
| 2013/0240203 A1 | 9/2013 | Frazier |
| 2013/0300066 A1 | 11/2013 | Xu et al. |
| 2013/0306327 A1 | 11/2013 | Williamson |
| 2013/0319668 A1 | 12/2013 | Tschetter et al. |
| 2013/0319682 A1 | 12/2013 | Tschetter et al. |
| 2013/0333891 A1 | 12/2013 | Fripp et al. |
| 2014/0000894 A1 | 1/2014 | Coffey et al. |
| 2014/0020911 A1 | 1/2014 | Martinez |
| 2014/0027128 A1 | 1/2014 | Johnson et al. |
| 2014/0041857 A1 | 2/2014 | Xu et al. |
| 2014/0060813 A1 | 3/2014 | Naedler et al. |
| 2014/0096970 A1 | 4/2014 | Andrew et al. |
| 2014/0102709 A1 | 4/2014 | Arabskyy |
| 2014/0116677 A1 | 5/2014 | Sherlin |
| 2014/0116721 A1 | 5/2014 | Hofman et al. |
| 2014/0116731 A1 | 5/2014 | Themig et al. |
| 2014/0116775 A1 | 5/2014 | Coffey et al. |
| 2014/0182862 A1 | 7/2014 | Derby |
| 2014/0196899 A1 | 7/2014 | Jordan et al. |
| 2014/0224476 A1 | 8/2014 | Frazier |
| 2014/0224477 A1 | 8/2014 | Wiese et al. |
| 2014/0231069 A1 | 8/2014 | VanLue |
| 2014/0231099 A1 | 8/2014 | Barbee et al. |
| 2014/0246189 A1 | 9/2014 | Beason et al. |
| 2014/0246208 A1 | 9/2014 | Themig et al. |
| 2014/0248448 A1 | 9/2014 | Sjostedt |
| 2014/0251594 A1 | 9/2014 | Garcia et al. |
| 2014/0251612 A1 | 9/2014 | Powers |
| 2014/0251636 A1 | 9/2014 | Hofman et al. |

* cited by examiner

DOWNHOLE TOOLS HAVING NON-TOXIC DEGRADABLE ELEMENTS AND THEIR METHODS OF USE

CROSS REFERENCE TO RELATED APPLICATIONS

This continuation-in-part application claims priority to U.S. patent application Ser. No. 13/894,649, filed May 15, 2013, which is a continuation of and claims priority to U.S. patent application Ser. No. 13/843,051, filed Mar. 15, 2013; and which claims the benefit of U.S. Provisional Application 61/648,749, filed May 18, 2012; U.S. Provisional Application 61/738,519, filed Dec. 18, 2012. All of the foregoing and U.S. Patent Publication No. 2010/0155050, published Jun. 24, 2010, which is now U.S. patent application Ser. No. 12/317,497, filed Dec. 23, 2008, are incorporated herein by reference.

U.S. Pat. No. 6,951,956 is also incorporated herein by reference.

BACKGROUND OF THE INVENTION

This specification relates to the field of mineral and hydrocarbon recovery, and more particularly to the use of high-molecular weight polyglycolic acid as a primary structural member for a degradable oilfield tool.

It is well known in the art that certain geological formations have hydrocarbons, including oil and natural gas, trapped inside of them that are not efficiently recoverable in their native form. Hydraulic fracturing ("fracking" for short) is a process used to fracture and partially collapse structures so that economic quantities of minerals and hydrocarbons can be recovered. The formation may be divided into zones, which are sequentially isolated, exposed, and fractured. Fracking fluid is driven into the formation, causing additional fractures and permitting hydrocarbons to flow freely out of the formation.

It is also known to create pilot perforations and pump acid through the pilot perforations into the formation, thereby dissolving the formation and allowing the hydrocarbons to migrate to the larger formed fractures or fissure.

To frac multiple zones, untreated zones must be isolated from already treated zones so that hydraulic pressure fractures the new zones instead of merely disrupting the already-fracked zones. There are many known methods for isolating zones, including the use of a frac sleeve, which includes a mechanically-actuated sliding sleeve engaged by a ball seat. A plurality of frac sleeves may be inserted into the well. The frac sleeves may have progressively smaller ball seats. The smallest frac ball is inserted first, passing through all but the last frac sleeve, where it seats. Applied pressure from the surface causes the frac ball to press against the ball seat, which mechanically engages a sliding sleeve. The pressure causes the sleeve to mechanically shift, opening a plurality of frac ports and exposing the formation. High-pressure fracking fluid is injected from the surface, forcing the frac fluid into the formation, and the zone is fracked.

After that zone is fracked, the second-smallest frac ball is pumped into the well bore, and seats in the penultimate sleeve. That zone is fracked, and the process is continued with increasingly larger frac balls, the largest ball being inserted last. After all zones are fracked, the pumpdown back pressure may move frac balls off seat, so that hydrocarbons can flow to the surface. In some cases, it is necessary to mill out the frac ball and ball seat, for example if back pressure is insufficient or if the ball was deformed by the applied pressure.

It is known in the prior art to manufacture frac balls out of carbon, composites, metals, and synthetic materials such as nylon. When the frac ball has fulfilled its purpose, it must either be removed through fluid flow of the well, or it must be destructively drilled out. Baker Hughes is also known to provide a frac ball constructed of a nanocomposite material known as "In-Tallic." In-Tallic balls are advertised to begin dissolving within 100 hours in a potassium chloride solution.

Another style of frac ball can be pumped to a different style of ball seat, engaging sliding sleeves. The sliding sleeves open as pressure is increased, causing the sleeves to overcome a shearing mechanism, sliding the sleeve open, in turn exposing ports or slots behind the sleeves. This permits the ports or slots to act as a conduit into the formation for hydraulic fracturing, acidizing or stimulating the formation.

SUMMARY OF THE INVENTION

In one exemplary embodiment, a plurality of mechanical tools for down hole use are described, each comprising substantial structural elements made with high molecular weight polyglycolic acid (PGA). The PGA of the present disclosure is hard, millable, substantially incompressible, and capable of being used as the material of downhole tools. The PGA material of the present disclosure begins to lose crystalline structure above about 136° F. Under a preferable thermal stress of at least approximately 250° F. the PGA material substantially loses its crystalline structure within approximately 48 hours. As the crystalline structure breaks down, the PGA tools lose compression resistance and structural integrity. After the crystalline structure breaks down, the material can be safely left to biodegrade over a period of several months. The products of biodegradation, are substantially glycine, carbon dioxide, and water, and are non-toxic to humans. PGA tools provide the advantage of being usable downhole and then, when their function is accomplished, removed from the well bore through passive degradation rather than active disposal. The disclosed downhole tools made of PGA material can be initially used as conventional downhole tools to accomplish conventional downhole tool tasks. Then, upon being subjected to downhole fluids at the described temperatures, for the described times, the tools lose (1) compression resistance and structural integrity which causes them to cease providing their conventional downhole tool tasks, followed by (2) passive degradation of the tools into environmentally-friendly materials. This permits them to be left in the well bore rather than having to be milled out or retrieved. Other benefits and functions are disclosed.

DETAILED DESCRIPTION OF THE EMBODIMENTS

Figure 1:
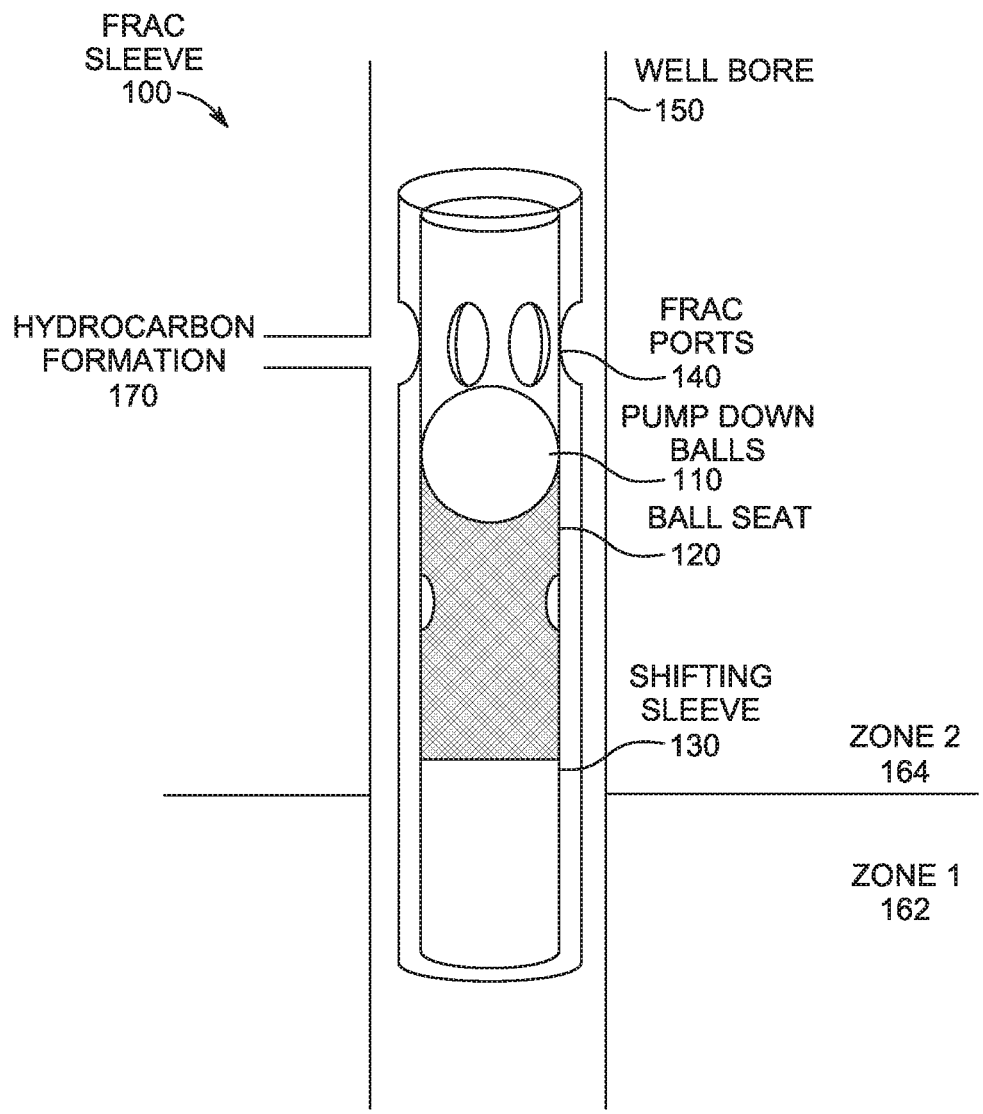
FIG. 1 is a cutaway side view of a frac sleeve actuated with a PGA frac ball.

One concern in the use of frac balls in production operations is that the balls themselves can become problematic. Because it is impossible to see what is going on in a well, if something goes wrong, it is difficult to know exactly what has gone wrong. It is suspected that prior art frac balls can sometimes become jammed, deformed, or that they can otherwise obstruct hydrocarbon flow when such obstruction is not desired.

One known solution to the problem of frac balls obstructing flow when obstruction is not desired is to mill out the prior art frac balls and the ball seats. But milling is expensive and takes time away from production. Baker Hughes has introduced a nanocomposite frac ball called In-Tallic.® In-Tallic® balls will begin to degrade within about 100 hours of insertion into the well, in the presence of potassium chloride. The In-Tallic material is relatively expensive and relatively unavailable.

Polyglycolic (PGA) acid is a polyester of glycolic acid. PGA is known in the art to biodegrade within approximately 12 months. PGA has been shown to have excellent short-term stability in ambient conditions. Kuredux®, and in particular Kuredux® grade 100R60, is a biodegradable PGA with excellent mechanical properties and processability. Frazier, et al. have identified a method of processing Kuredux® PGA resin into mechanical tools for downhole drilling applications, for example for hydrocarbon and mineral recovery and structures and methods for using them.

The Applicant has made and tested PGA frac balls of the present disclosure by leaving them in room temperature tap water for months at a time. After two months, the PGA frac balls showed no signs of substantial degradation or structural changes. Applicant's PGA frac balls show no appreciable sign of degradation in ambient moisture conditions over a period of at least one year.

In one test of an exemplary embodiment, a 3.375-inch PGA frac ball withstood 6,633 psi before structural failure. A 2.12-inch frac ball withstood 14,189 psi before failing. A 1.5-inch in frac ball withstood at least 15,000 psi for 15 minutes without failing. A failure point of the 1.5-inch frac ball was not reached because the test rig was not able to exceed 15,000 psi. Thus, a PGA frac ball is suitable for high pressure downhole hydrocarbon recovery operations.

PGA frac balls can be pumped down a well bore from the surface. Typically, the initial pumping fluid is approximately 50 to 75° Fahrenheit, which condition does not have any appreciable effect on the short-term structural integrity of the frac ball. Bottom hole temperatures are known to increase with depth, as shown, for example, in FIG. 3 of Comprehensive Database of Wellbore Temperatures and Drilling Mud Weight Pressures by Depth for Judge Digby Field, Louisiana, Open-File Report 2010-1303, U.S. Department of the Interior, U.S. Geological Survey. The Department of Interior FIG. 3 chart is incorporated by reference and shows a relatively linear line temperature vs. depth relationship from about 75° F. at about 4,500 feet to about 400° F. at about 24,000 feet. South Texas oil wells typically have depths from about 5,000 to 11,000 feet. When fracking operations commence, however, the higher fracking pressures cause the temperature of the downhole fluid to rise dramatically. The PGA frac ball performs as a conventional frac ball, sealing against the bridge plug seat to block the well bore. When fracking operations commence, however, the higher fracking pressures cause the temperature of the downhole fluid to rise dramatically. Downhole fracking fluid temperatures of South Texas wells typically range from 250° F. to 400° F. Temperature ranges vary around the world, in different formations, conditions, and procedures and thus may be higher or lower at other locations and conditions and procedures. Once the PGA frac ball is exposed to the higher temperature and pressure conditions of the fracking operation, it first continues to function as a conventional frac ball, sealing against the bridge plug's seat to block the fracking operation while it begins to lose its structural integrity. Sufficient structural integrity is maintained during the fracking operation for the GPA frac ball to continue to function as a conventional frac ball. After the fracking operation ends, the PGA frac ball deteriorates, loses its structural integrity, passes through the bridge plug seat, and ceases to block the well bore. Under testing, a 140 g sample was placed in water at 150° F. for four days. After four days, the mass had decreased to 120 g. In a second test, a 160 g sample was placed in water at 200° F. for four days. After four days, the mass of the sample had decreased to 130 g. Acids may expedite dissolution. Kureha Corporation has provided the following formula for estimating single-sided degradation of molded PGA from thermal stress alone, measured in mm/h.

$$\Delta mm = -0.5 \exp(23.654 - 9443/K)$$

These time spans are consistent with the times at which conventional frac balls are drilled out, after their fracking operation blocking function has been accomplished. Therefore, the PGA frac ball can be used as a conventional frac ball and perform the fracking operation blocking function of a conventional frac ball, but can then be left in the well rather than drilling it out or other intervention by the operator. In an exemplary application, a series of frac balls is used in a fracking operation. After they perform their fracking operation function, the frac balls begin to lose structural integrity, their volumes decrease slightly and they pass through their respective ball seats and move toward the toe of the well bore. The frac balls each continue to lose structural integrity until they each eventually form a soft mush without appreciable crystalline structure. This material can be left downhole without concern. Over a period of months, the PGA material biodegrades to environmentally friendly fluids and gases. In one exemplary embodiment, PGA frac balls substantially lose structure of integrity within approximately 48 hours in a well with an average temperature of approximately 250° F., and completely biodegrades over several months.

Further advantageously, degradation of PGA is commonly accomplished by random hydrolysis of ester bonds. The breaking of these ester bonds reduces PGA to glycolic acid, an organic substance that is not considered a pollutant and is not generally harmful to the environment or to people. Indeed, glycolic acid is used in many pharmaceutical preparations for absorption into the skin. Glycolic acid may further breakdown into glycine, or carbon dioxide and water. Thus, even in the case of PGA mechanical tools that are ultimately drilled out, the remnants can be safely discarded without causing environmental harm.

Degradation of PGA commonly takes place in two stages. In the first stage, water diffuses into the amorphous regions. In the second stage, the crystalline areas degrade. Once serious degradation begins, it can progress rapidly. In many cases, a mechanical tool made of PGA will experience sudden mechanical failure at an advantageous time after it has fulfilled its purpose, for example, within approximately 2 days. It is believed that mechanical failure is achieved by the first stage, wherein the crystalline structure is compromised by hydrolysis. The resultant compromised material is a softer, more malleable PGA particulate matter that otherwise retains its chemical and mechanical properties. Over time, the particulate matter enters the second stage and begins biodegradation proper.

Processing of the PGA material comprises obtaining appropriate PGA, extruding it into machinable stock, and machining it into the desired configuration. In one embodiment, Kuredux® brand PGA is purchased from the Kureha Corporation. In an exemplary embodiment, grade 100R60 PGA is purchased from Kureha Corporation through its U.S. supplier, Itochu in pellet form. The pellets are melted down and extruded into bars. In one embodiment, the extruded Kuredux® PGA resin bars are cut and machined into up to 63 different sizes of PGA balls ranging in size from 0.75 inches to 4.625 inches in 1/16-inch increments. In a preferred embodiment, the balls are milled on a lathe. The 63 different sizes correspond to matching downhole tool sliding sleeves. The smallest ball can be put down into the well first and seat onto the smallest valve. The next smallest ball can be pumped down and seat on the second smallest seat, and so forth. These ranges and processing methods are provided by way of example only. PGA frac balls smaller than 0.75 inches or larger than 4.625 inches and with different size increments can be manufactured and use in other embodiments, injection molding or thermoforming techniques known in the art may also be used.

In an exemplary embodiment of the present invention, a well bore 150 is drilled into a hydrocarbon bearing formation 170. A frac sleeve 100 inserted into well bore 150 isolates the zone 1 designated 162 from zone 2 designated 164. Zone 1 and zone 2 are conceptual divisions, and are not explicitly delimited except by frac sleeve 100 itself. In an exemplary embodiment, hydrocarbon formation 170 may be divided into 63 or more zones to the extent practical for the well as is known in the art. Zone 1 162 has already been fracked, and now zone 2 164 needs to be fracked. PGA frac ball 110, which has an outer diameter selected to seat securely into ball seat 120, is pumped down into the well bore 150. In some embodiments, frac sleeve 100 forms part of the tubing or casing string.

Frac sleeve 100 includes a shifting sleeve 130, which is rigidly engaged to ball seat 120. Initially, shifting sleeve 130 covers frac ports, 140. When PGA frac ball 110 is seated into ball seat 120 and high-pressure fracking fluid fills well bore 150, shifting sleeve 130 mechanically shifts, moving in a down-hole direction. This shifting exposes frac ports 140, so that there is fluid communication between frac ports 140 and hydrocarbon formation 170. As the pressure of fracking fluid increases, hydrocarbon formation 170 fractures, freeing trapped hydrocarbons from hydrocarbon formation 170.

Frazier, et al., have found that PGA frac balls made of Kuredux® PGA resin will begin to sufficiently degrade in approximately 48 hours in aqueous solution at approximately 250° F. that the PGA frac ball will cease to be held upon its seat and instead pass through the seat to unblock the well bore. The substrate PGA material has a crystalline state with about a 1.9 g/cm$^3$ density and an amorphous state with an about 1.5 g/cm$^3$ density. It is believed that the described PGA frac ball, when pumped down the well, begins in a hard, crystalline state and that its immersion in hot downhole fluid, at least as hot as 136° F., causes the PGA frac ball to change from its hard crystalline state into its more malleable amorphous state. The frac ball in the hot downhole fluid may also be losing exterior surface mass as it hydrolyzes. These processes both reduce the frac ball's diameter and make the serially-revealed outer material of the frac ball more malleable. The high pressure of fracking on the frac ball against the seat is believed to deform the spherical PGA frac ball in its partially amorphous state and deteriorating outer surface, by elongating it through the seat and eventually pushing it through the seat. The presence of acids in the water will enhance solubility of the frac ball and speed degradation. Increasing well bore pressure is believed to speed release of the frac ball by increasing fluid temperature and mechanical stress on the ball at the ball/seat interface.

Advantageously, PGA frac balls made of Kuredux® PGA resin have strength similar to metals. This allows them to be used for effective isolation in the extremely high pressure environment of fracking operations. Once the Kuredux® PGA resin balls start to degrade, they begin to lose their structural integrity, and easily unseat, moving out of the way of hydrocarbon production. Eventually, the balls degrade completely.

In the previous example, Kuredux® PGA frac balls are provided in sizes between 0.75 inches and 4.625 inches, to facilitate operation of frac sleeves of various sizes. In other embodiments, balls may be provided in increments from about 1 inch up to over about 4 inches. In some applications, ball sizes may be increased in one-eighth inch increments. In other applications, the incremental increase may be in sixteenths of an inch. Size as are a matter of choice and convention. Thus, in some cases, provision can be made for fracking up to 63 zones with a single run of frac balls.

Furthermore, in some embodiments of a frac sleeve, multiple balls must be pumped into the sleeve to complete the operation. For example, some prior art systems require up to four frac balls to operate a frac sleeve. In those cases, a plurality of identically sized PGA frac balls 110 may be used.

In an alternative preferred embodiment, a frac ball 110 is pumped down into the wellbore, seated in an independent ball seat at the lower end of the well, and pressure is applied at the surface of the well to volume test the casing. This enables a volume test on the casing without intervention to remove the frac ball 110, which naturally biodegrades.

Kuredux® PGA resin can also be used to manufacture other downhole tools that are designed to be used to perform their similar conventional tool function but, rather than them being removed from the well bore by being drilled out instead deteriorate as taught herein. For example, a flapper valve, such as is disclosed in U.S. Pat. No. 7,287,596, incorporated herein by reference, can be manufactured with Kuredux, so that it can be left to deteriorate after a zone has been fracked. A composite bridge plug can also be manufactured with Kuredux Corporation. This may obviate the need to mill out the bridge plug after fracking, or may make milling out the bridge plug faster and easier. As disclosed herein, such elements will initially function as conventional elements; but, after being subjected to downhole fluids of the pressures and temperatures disclosed herein will degrade and then degrade, eliminating the need to mechanically remove them from the well.

Kuredux® PGA resin specifically has been disclosed here as an exemplary material for use in creating degradable PGA frac balls and downhole tools, but it should be understood that any material with similar properties can be used. Furthermore, while the PGA balls in this exemplary embodiment are referred to as "PGA frac balls," those having skill in the art will recognize that such balls have numerous applications, including numerous applications in hydrocarbon recovery. Embodiment disclosed herein includes any spherical ball constructed of substantially of high-molecular weight polyglycolic acid which has sufficient compression resistance and structural integrity to be used as a frac ball in hydrocarbon recovery operations and which then degrades and degrades, as it is not necessary to mechanically remove the ball from the well.

Figure 2:
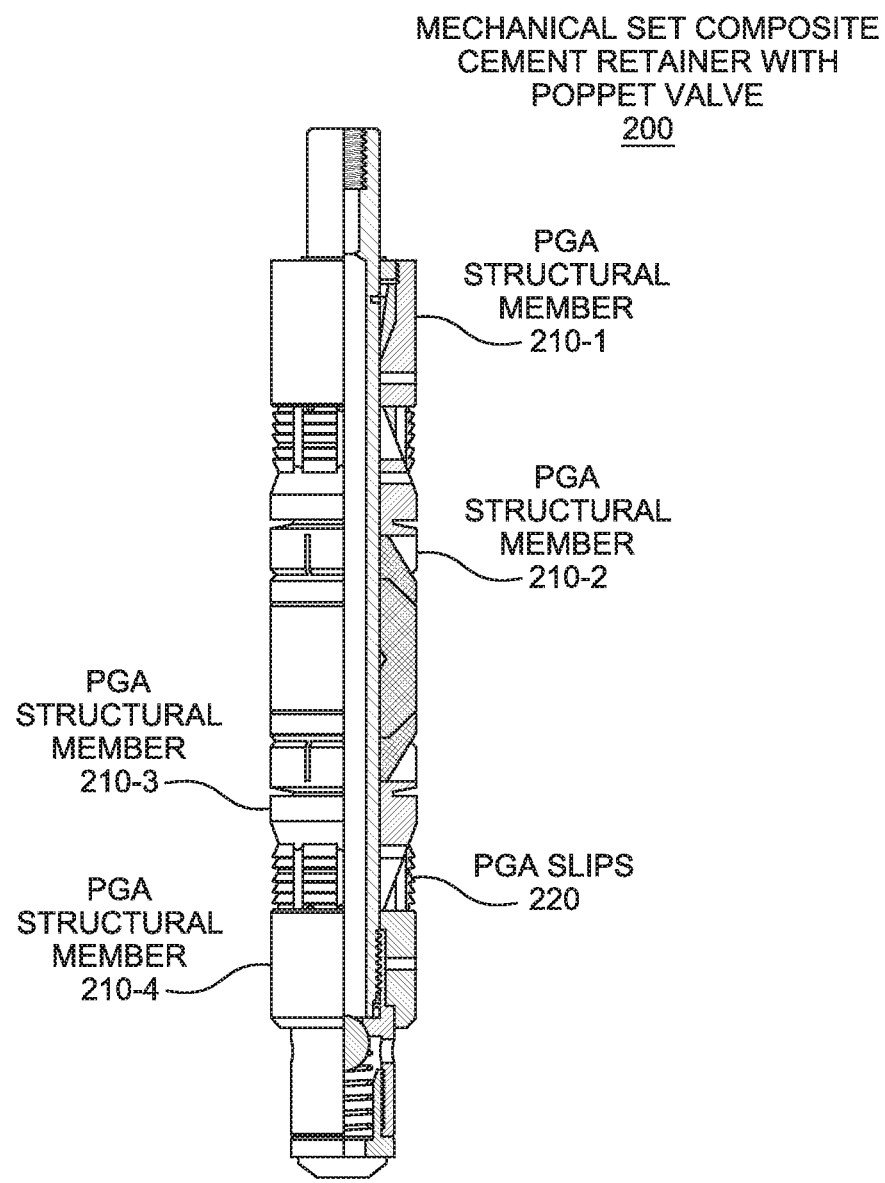
FIG. 2 is a cutaway side view of a mechanical set composite cement retainer with poppet valve, having PGA structural members.

FIG. 2 is a cutaway side view of an exemplary embodiment of a composite set retainer with poppet valve 200, having a plurality of PGA structural members 210. In the exemplary embodiment, cement retainer 200 is operated according to methods known in the prior art. For example, cement retainer 200 can be set on wireline or coiled tubing using conventional setting tools. Upon setting, a stinger assembly is attached to the workstring and run to retainer depth. The stinger is then inserted into the retainer bore, sealing against the mandrel inner diameter and isolating the workstring from the upper annulus.

Cement retainer 200 also includes PGA slips, which may be structurally similar to prior art iron slips, but which are molded or machined PGA according to methods disclosed herein. Teeth may be added to the tips of PGA slips 220 to aid in gripping the well casing, and may be made of iron, tungsten-carbide, or other hardened materials known in the art. In other embodiments, PGA slip may include a PGA base material with hardened buttons of ceramic, iron, tungsten-carbide, or other hardened materials embedded therein. Some embodiments of cement retainer 200 may be configured for use with a PGA frac ball 110.

Once sufficient set down weight has been established, applied pressure (cement) is pumped down the workstring, opening the one-way check valve and allowing communication beneath the cement retainer 200. Cement retainer 200 has a low metallic content and in some embodiments, may require no drilling whatsoever. Rather, cement retainer 200 is left in the well bore and PGA structural members 210 and PGA slips 220 are permitted to break down naturally. In some embodiments, the remaining metallic pieces may be sufficiently small to pump out of the well bore. In other embodiments, minimal drilling is required to clean out remaining metallic pieces.

Figure 3:
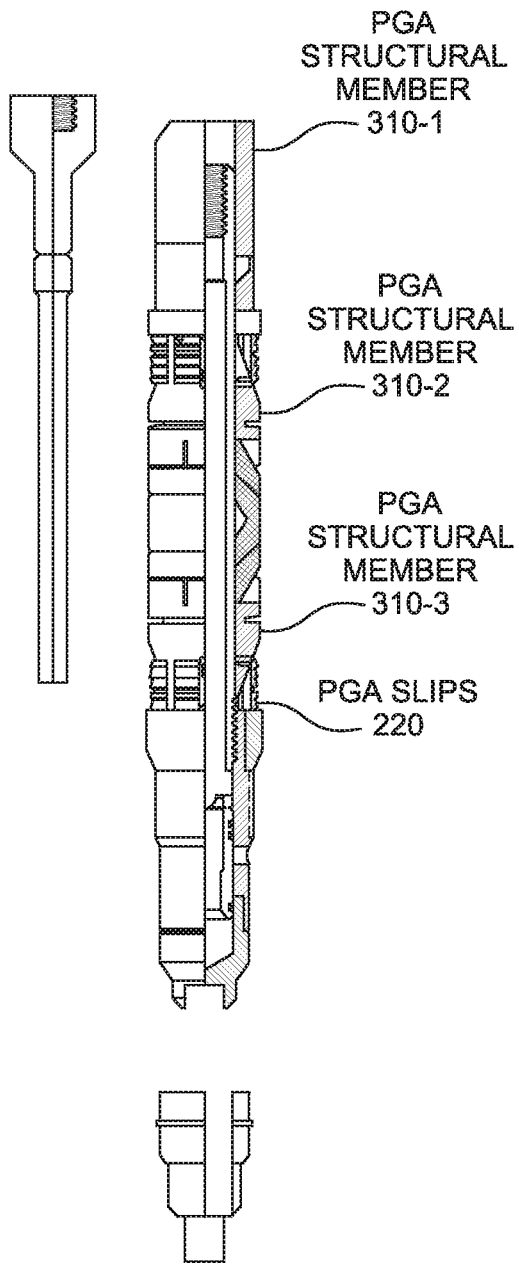
FIG. 3 is a cutaway side view of a wireline set composite cement retainer with sliding check valve, having PGA structural members.

FIG. 3 is a cutaway side view of an exemplary embodiment of a wireline set cement retainer with sliding sleeve 300. Cement retainer 300 includes a plurality of PGA structural members 310, including PGA structural member 310-1, PGA structural member 310-2, PGA structural member 310-3, and PGA slips 220. In an exemplary embodiment, cement retainer 300 is operated according to methods known in the prior art. For example, cement retainer 300 can be set on wireline or coiled tubing using conventional setting tools. Upon setting, a stinger assembly is attached to the workstring and run to retainer depth. The stinger is then inserted into the retainer bore, sealing against the mandrel inner diameter and isolating the workstring from the upper annulus. Once sufficient set down weight has been applied, the stinger assembly opens the lower sliding sleeve, allowing the squeeze operation to be performed.

Cement retainer 300 has a low metallic content and in some embodiments, may require no drilling whatsoever. Rather, cement retainer 300 is left in the well bore and PGA structural members 310 are permitted to break down naturally. In some embodiments, the remaining metallic pieces may be sufficiently small to pump out of the well bore. In other embodiments, minimal drilling is required to clean out remaining metallic pieces. Some embodiments of cement retainer 300 may be configured for use with a PGA frac ball 110.

Figure 4:
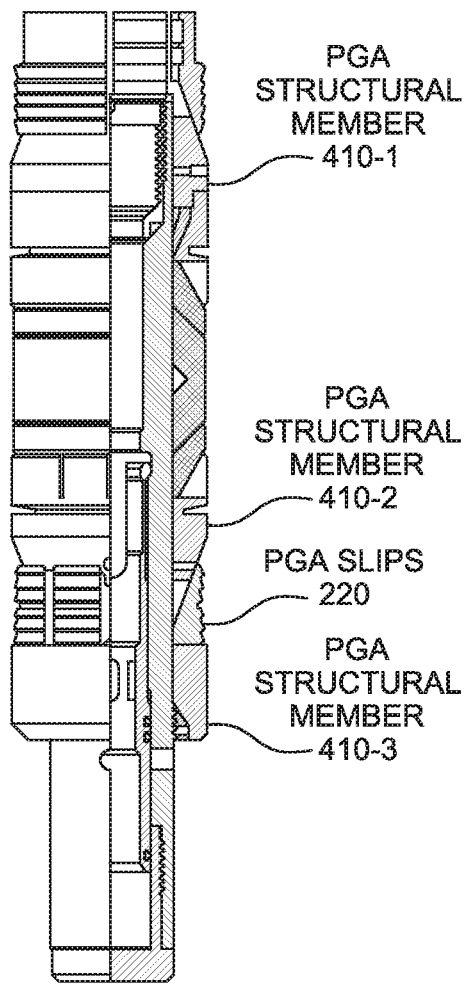
FIG. 4 is a cutaway side view of a mechanical set composite cement retainer with sliding sleeve check valve, having PGA structural members.

FIG. 4 is a cutaway side view of an exemplary embodiment of a mechanical set cement retainer with sliding sleeve check valve 400. Cement retainer 400 includes a plurality of PGA structural members 410 and PGA slips 220. In an exemplary embodiment, cement retainer 400 is operated according to methods known in the prior art. For example, cement retainer 400 can be set on tubing using conventional mechanical setting tools. Once set mechanically, an acceptable workstring weight is then set on the retainer for a more secure fit.

During the cementing operation, simple valve control can be accomplished through surface pipe manipulation, causing the hydraulic forces to either add or subtract weight to cement retainer 400. The operator should complete the hydraulic calculations to prevent overloading or pumping out of the retainer. The cementing process can then begin.

Cement retainer 400 has a low metallic content and in some embodiments, may require no drilling whatsoever. Rather, cement retainer 400 is left in the well bore and PGA structural members 410 are permitted to break down naturally. In some embodiments, the remaining metallic pieces may be sufficiently small to pump out of the well bore. In other embodiments, minimal drilling is required to clean out remaining metallic pieces. Some embodiments of cement retainer 400 may be configured for use with a PGA frac ball 110.

Figure 5:
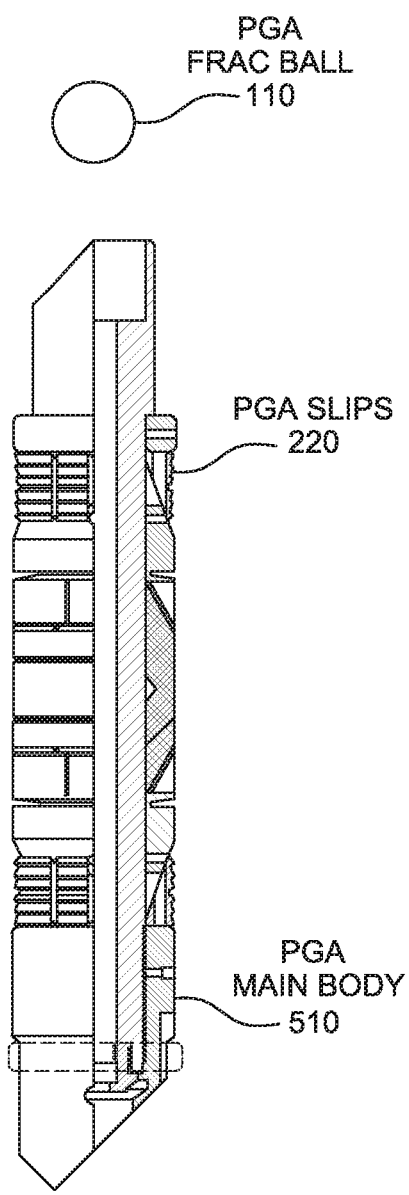
FIG. 5 is a cutaway side view of a PGA frac plug.

FIG. 5 is a cutaway side view of an exemplary embodiment of a PGA frac plug 500. Frac plug 500 includes a PGA main body 510, and in some embodiments may also include PGA slips 220.

In an exemplary embodiment, PGA frac plug 500 is operated according to methods known in the prior art. For example, after performing the setting procedure known in the art, frac plug 500 remains open for fluid flow and allows wireline services to continue until the ball drop isolation procedure has started. The ball drop isolation procedure may include use of a PGA frac ball 110. Once the surface-dropped ball is pumped down and seated into the inner funnel top of the tool, the operator can pressure up against the plug to achieve isolation.

Frac plug 500 has a low metallic content and in some embodiments, may require no drilling whatsoever. Rather, PGA frac plug 500 is left in the well bore and PGA main body 510 and PGA slip 520 are permitted to break down naturally. In some embodiments, the remaining metallic pieces may be sufficiently small to pump out of the well bore. In other embodiments, minimal drilling is required to clean out remaining metallic pieces. Some embodiments of frac plug 500 may be configured for use with a PGA frac ball 110.

In the prior art, frac plugs such as PGA frac plug 500 are used primarily for horizontal applications. But PGA frac plug 500's slim, lightweight design makes deployment fast and efficient in both vertical and horizontal wells.

Figure 6:
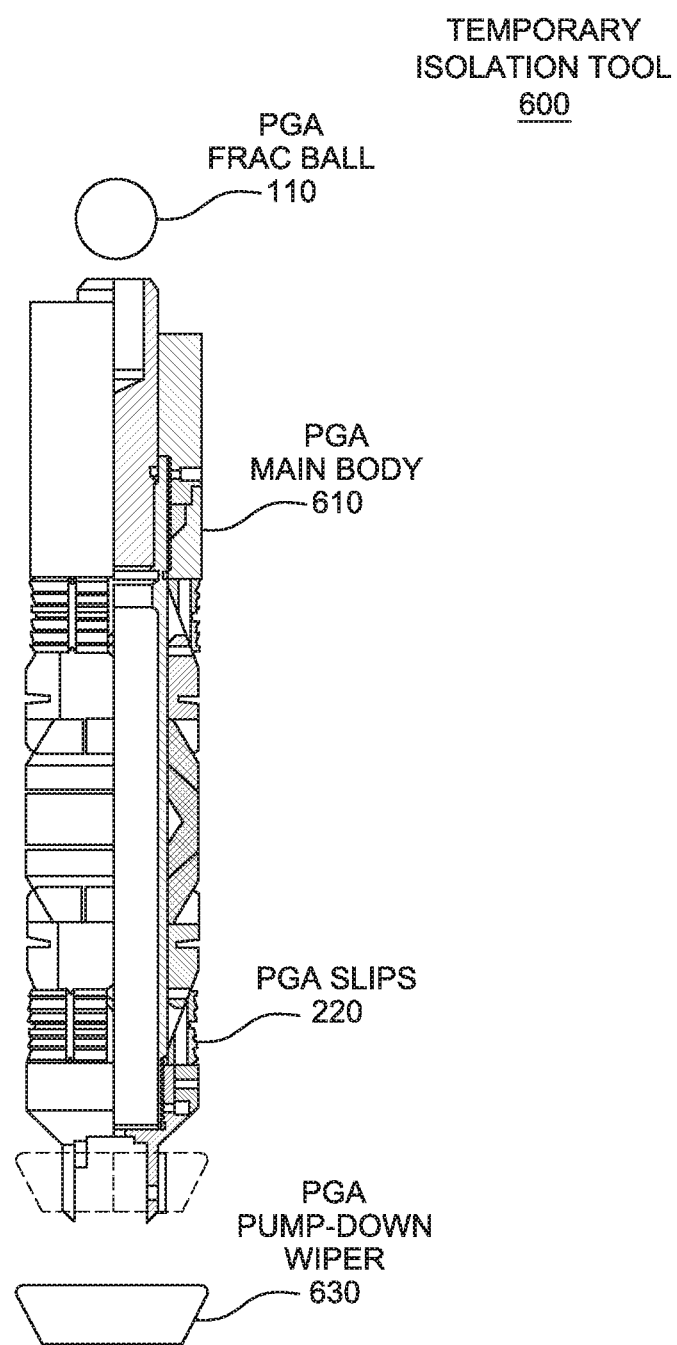
FIG. 6 is a cutaway side view of a temporary isolation tool with PGA structural members.

FIG. 6 is a cutaway side view of an exemplary embodiment of a temporary isolation tool 600, including a PGA main body 610 and PGA slips 220. In the exemplary embodiment, temporary isolation valve 600 is operated according to methods known in the prior art. In one embodiment, temporary isolation tool 600 is in a "ball drop" configuration, and PGA frac ball 620 may be used therewith. As is known in the art, temporary isolation tool 600 may be combined with three additional on-the-fly inserts (a bridge plug, a flow-back valve, or a flow-back valve with a frac ball), providing additional versatility. In some embodiments, a degradable PGA pumpdown wiper 630 may be employed to aid in inserting temporary isolation tool 600 into horizontal well bores.

Built with a one-way check valve, temporary isolation tool 600 temporarily prevents sand from invading the upper zone and eliminates cross-flow problems for example by using a PGA frac ball 110 as a sealer. After PGA frac ball 110 has been degraded by pressure, temperature or fluid, the check valve will allow the two zones to commingle. The operator can then independently treat or test each zone and remove flow-back plugs in an under-balanced environment in one trip.

Temporary isolation tool 600 has a low metallic content and in some embodiments, may require no drilling whatsoever. Rather, cement retainer 600 is left in the well bore and PGA structural members 610 are permitted to break down naturally. In some embodiments, the remaining metallic pieces may be sufficiently small to pump out of the well bore. In other embodiments, minimal drilling is required to clean out remaining metallic pieces.

Figure 7:
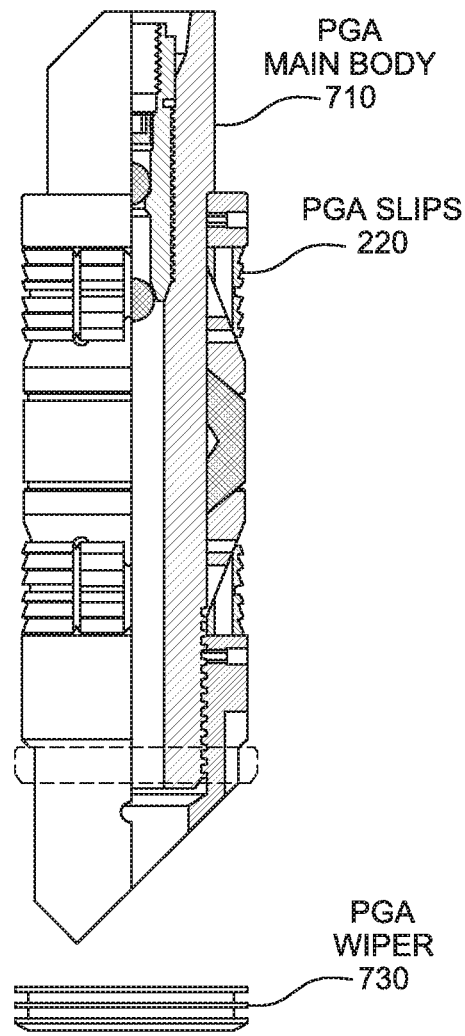
FIG. 7 is a cutaway side view of a snub nose composite plug having PGA structural members.

FIG. 7 is a cutaway side view of an exemplary embodiment of a snub nose plug 700. Sub-nose plug 700 includes a PGA main body 720, and PGA slips 220. A soluble PGA wiper 730 may be used to aid in inserting snub-nose plug 700 into horizontal well bores. In one embodiment, snub-nose plug 700 is operated according to methods known in the prior art. Degradable PGA wiper 730 may be used to aid insertion of snub-nose plug 700 into horizontal well bores.

Snub-nose plug 700 may be provided in several configurations with various types of valves. In one embodiment, snub-nose plug 700 may be used in conjunction with a PGA frac ball 110.

Snub-nose plug 700 has a low metallic content and in some embodiments, may require no drilling whatsoever. Rather, cement retainer 700 is left in the well bore and PGA structural members 710 are permitted to break down naturally. In some embodiments, the remaining metallic pieces may be sufficiently small to pump out of the well bore. In other embodiments, minimal drilling is required to clean out remaining metallic pieces.

Figure 8:
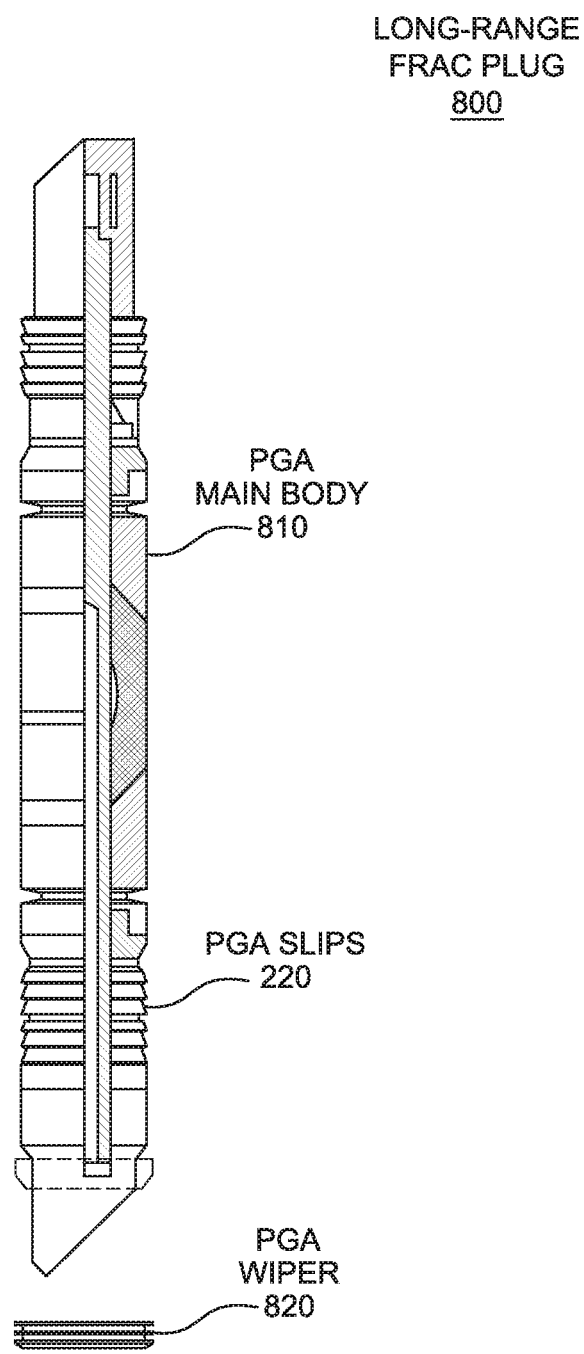
FIG. 8 is a cutaway side view of a long-range PGA frac plug.

FIG. 8 is a cutaway side view of an exemplary embodiment of long-range frac plug. In one embodiment, frac plug 810 includes a PGA body. A degradable PGA wiper 820 may be provided to aid in insertion into horizontal well bores. In one embodiment, long-range composite frac plug 800 is operated according to methods known in the prior art, enabling wellbore isolation in a broad range of environments and applications. Because frac plug 800 has a slim outer diameter and expansive reach, it can pass through damaged casing, restricted internal casing diameters or existing casing patches in the well bore.

When built with a one-way check valve, frac plug 800 temporarily prevents sand from invading the upper zone and eliminates cross-flow problems, in some embodiments by utilizing a PGA frac ball 110. After PGA frac ball 110 has been degraded, the check valve will allow the two zones to commingle. The operator can then independently treat or test each zone and remove the flow-back plugs in an under-balanced environment in one trip.

Frac plug 800 has a low metallic content and in some embodiments, may require no drilling whatsoever. Rather, cement retainer 800 is left in the well bore and PGA structural members 810 are permitted to break down naturally. In some embodiments, the remaining metallic pieces may be sufficiently small to pump out of the well bore. In other embodiments, minimal drilling is required to clean out remaining metallic pieces.

Figure 9:
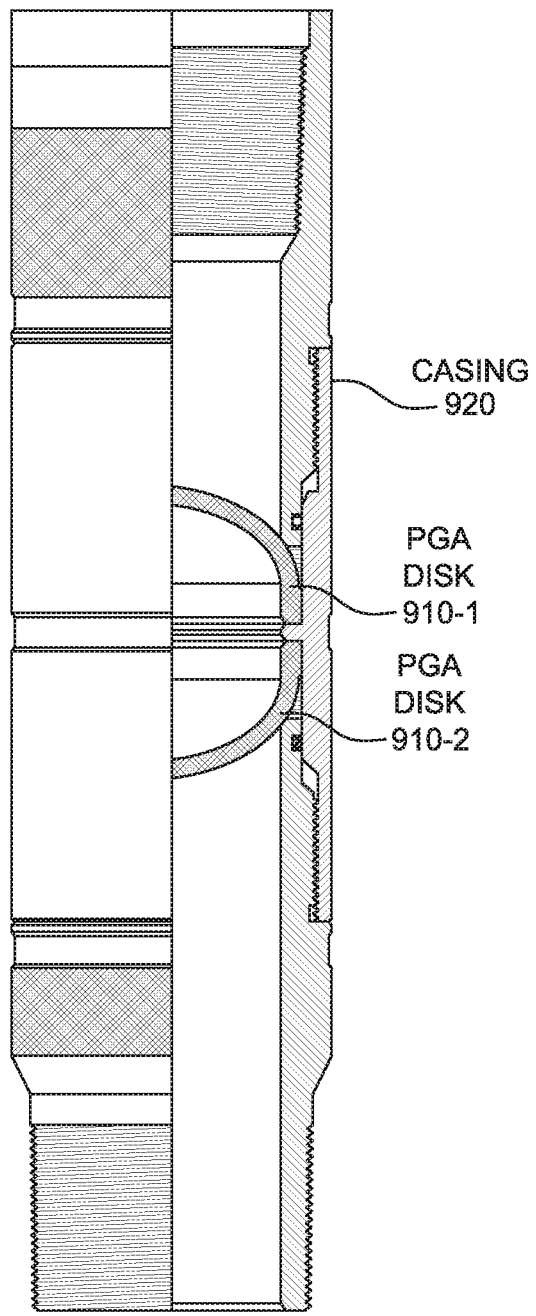
FIG. 9 is a cutaway side view of a dual disk frangible knockout isolation sub, having PGA disks.

FIG. 9 is a cutaway side view of an exemplary embodiment of a dual-disk frangible knockout isolation sub 900. In an exemplary embodiment, isolation sub 900 includes a metal casing 920 that forms part of the tubing or casing string. Isolation sub 900 is equipped with two PGA disks 910, which may be dome-shaped as shown, or which may be solid cylindrical plugs. PGA disks 910 isolate wellbore reservoir pressure in a variety of downhole conditions. In an exemplary embodiment, isolation sub 900 is operated according to methods known in the prior art.

In operation, PGA disks 910 are configured to withstand conditions such as intense heat and heavy mud loads. The isolation sub 900 is run on the bottom of the tubing or below a production packer bottom hole assembly. After the production packer is set, the disks isolate the wellbore reservoir.

After the upper production bottom hole assembly is run in hole, latched into the packer, and all tests are performed, PGA disks 910 can be drilled out, or knocked out using a drop bar, coil tubing, slickline or sand line, or they can be left to degrade on their own. Once PGA disks 910 are removed, the wellbore fluids can then be produced up the production tubing or casing string. The individual PGA pieces then biodegrade in an environmentally-responsible manner.

Figure 10:
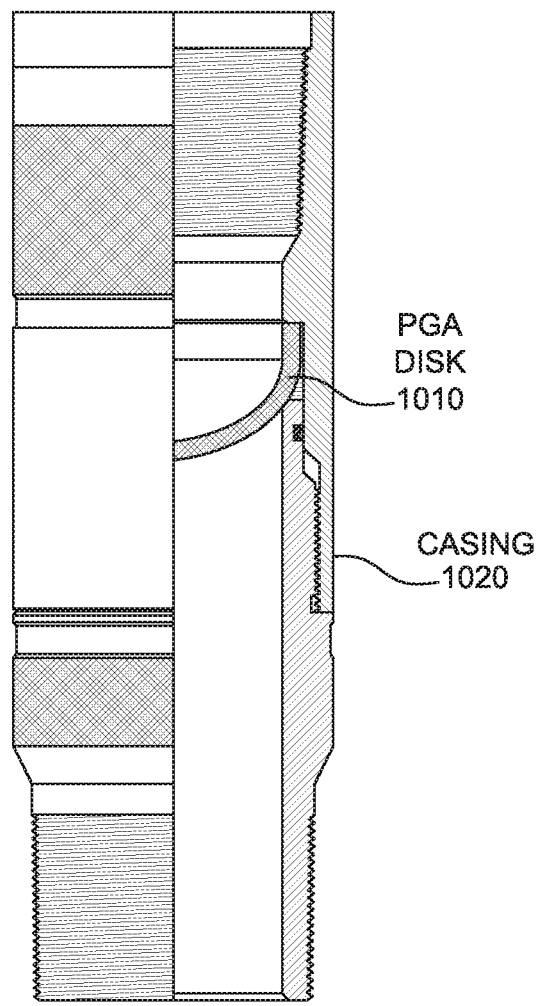
FIG. 10 is a cutaway side view of a single disk frangible knockout isolation sub.

FIG. 10 is a cutaway side view of an exemplary embodiment of a single-disk frangible knockout isolation sub. In an exemplary embodiment, isolation sub 1000 includes a metal casing 1020 that forms part of the tubing or casing string. Isolation sub 1000 is equipped with a single PGA disk 1010, which may be dome-shaped as shown or which may be a solid cylindrical plug. PGA disk 1010 isolates wellbore reservoir pressure in a variety of downhole conditions.

For both snubbing and pump-out applications, isolation sub 1000 provides an economical alternative to traditional methods. Designed to work in a variety of conditions, isolation sub 1000 provides a dependable solution for a range of isolation operations.

Isolation sub 1000 is run on the bottom of the tubing or below a production packer bottom hole assembly. Once the production packer is set, isolation sub 1000 isolates the wellbore reservoir.

After the upper production bottom hole assembly is run in hole, latched into the packer, and all tests are performed, PGA disk 1010 can be pumped out. In an exemplary embodiment, removal comprises applying overbalance pressure from surface to pump out PGA disk 1010. In other embodiments, drop bar, coil tubing, slickline or sand line can also be used. In yet other embodiments, PGA disk 1010 is left to degrade on its own. Once disk 1010 is removed, wellbore fluids can be produced up the production tubing.

Figure 11:
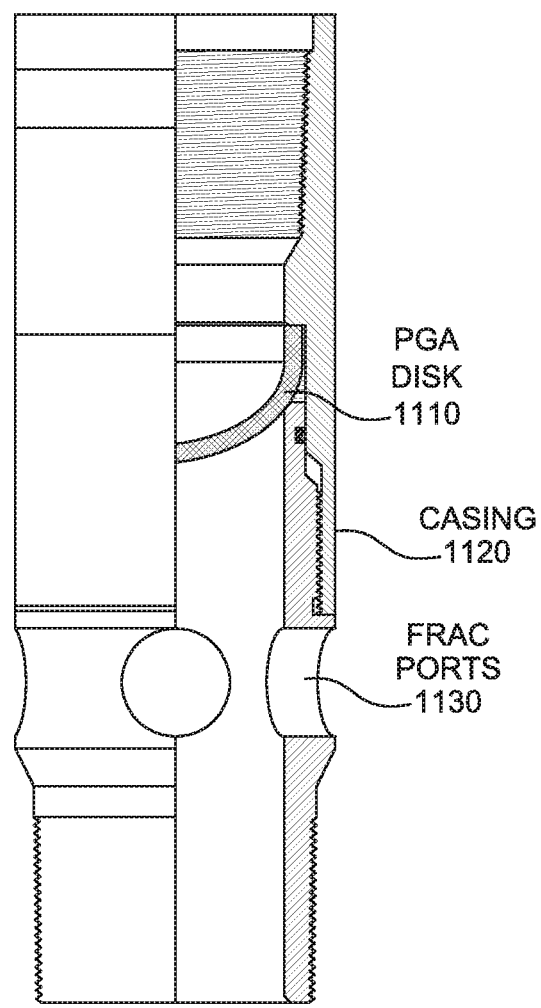
FIG. 11 is a cutaway side view of an underbalanced disk sub having a PGA disk.

FIG. 11 is a cutaway side view of an exemplary embodiment of an underbalanced disk sub 1100, including a metal casing 1120, which is part of the tubing or casing string, and production ports 1130, which provide for hydrocarbon circulation. A single PGA disk 1110 is provided for zonal isolation. In an exemplary embodiment, isolation sub 1100 is operated according to methods known in the prior art.

Figure 12:
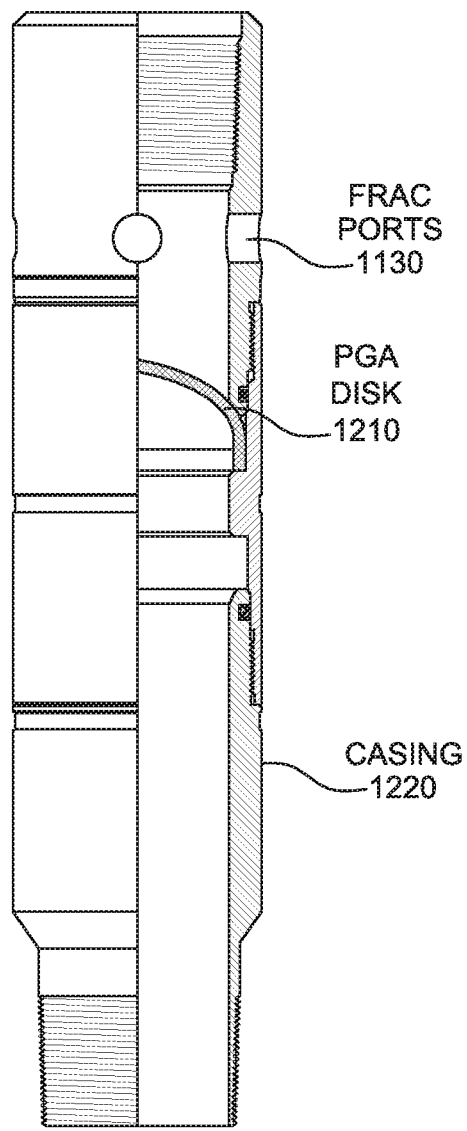
FIG. 12 is a cutaway side view of an isolation sub having a PGA disk.

FIG. 12 is a cutaway side view of an exemplary embodiment of an isolation sub 1200, including a metal casing 1220, which is part of the tubing or casing string, and ports 1230, which provide for hydrocarbon circulation. A single PGA disk 1210 is provided for zonal isolation. In an exemplary embodiment, isolation sub 1200 is operated according to methods known in the prior art.

Figure 13:
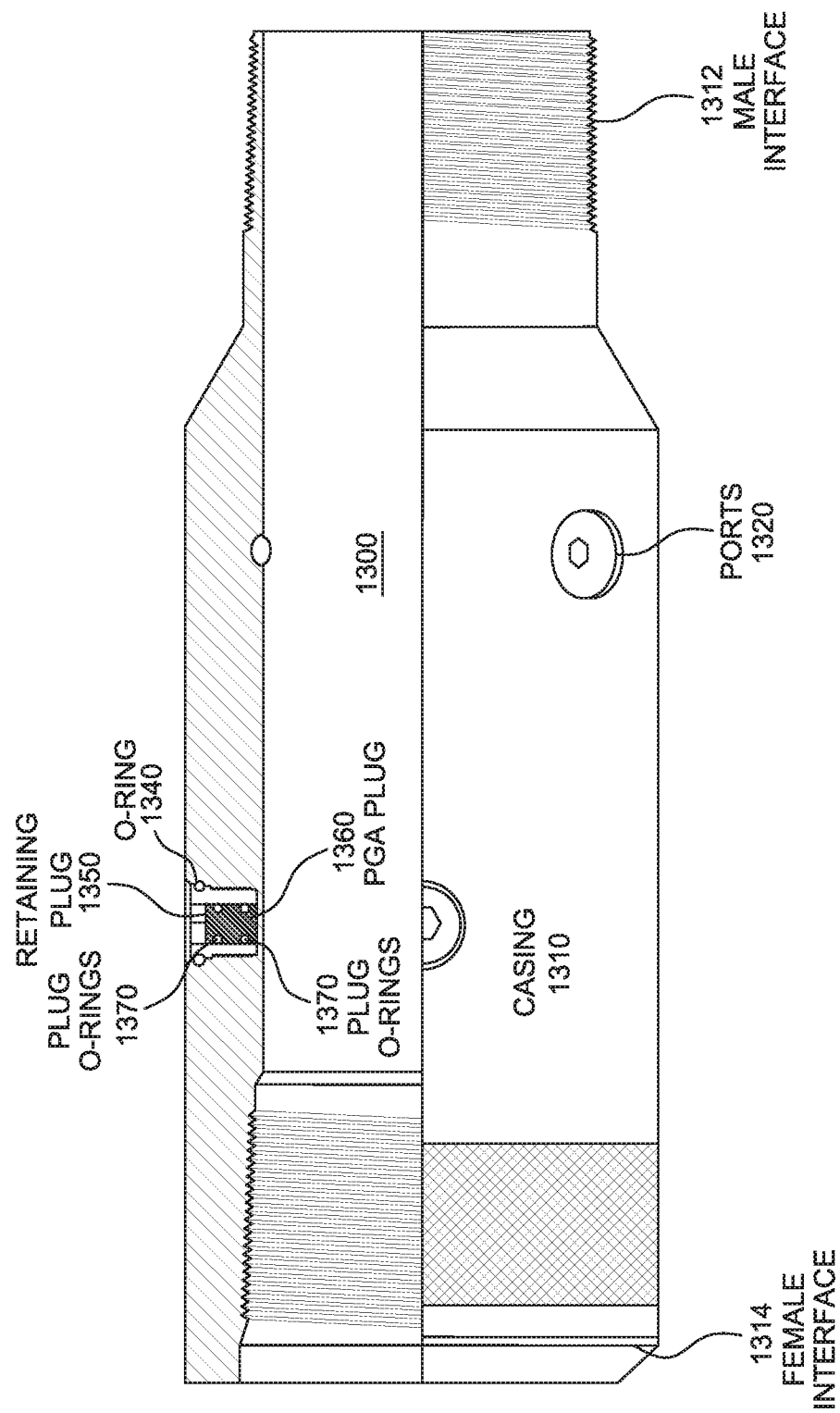
FIGS. 13-13C are detailed views of an exemplary embodiment of a balldrop isolation sub with PGA plugs.
Figure 13A:
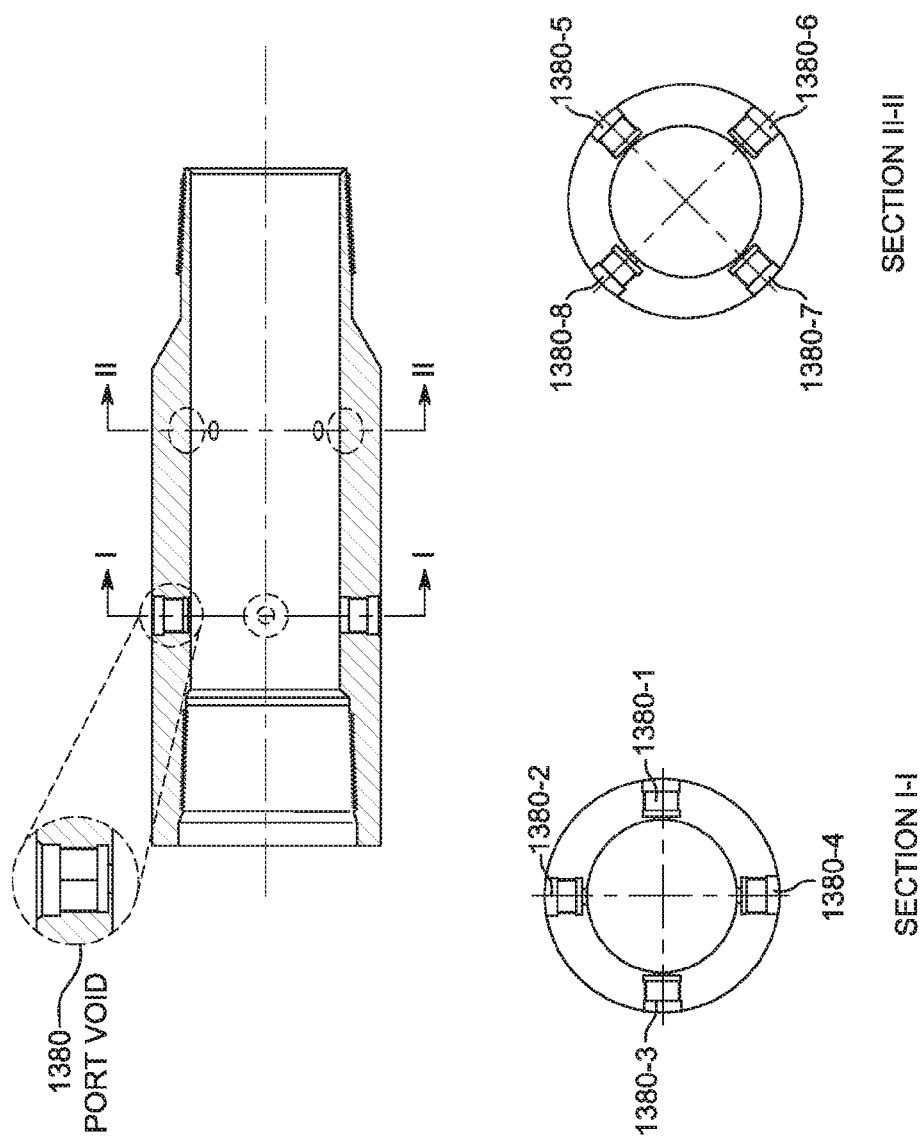
Figure 13B:
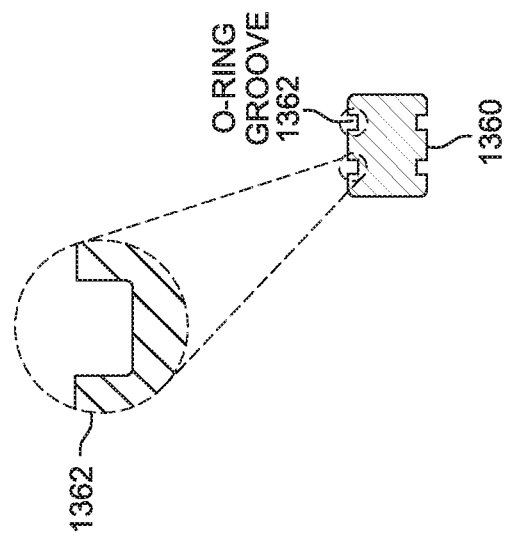
Figure 13C:
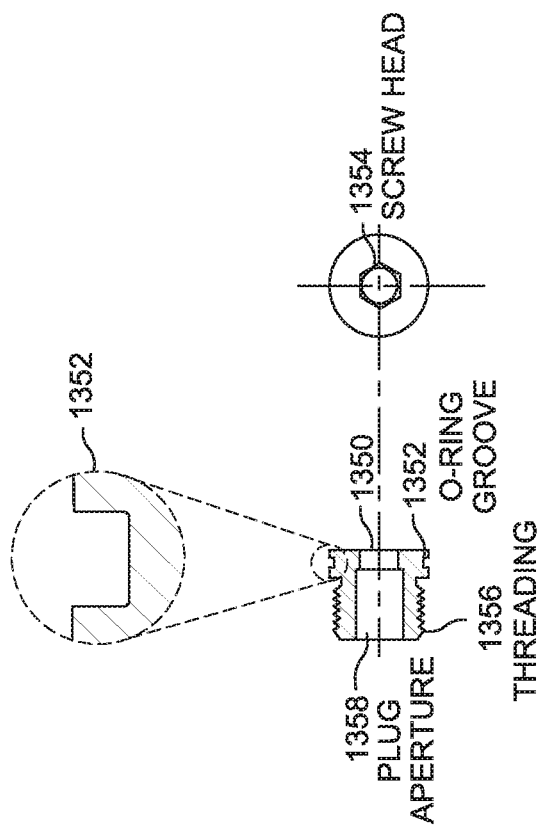

FIGS. 13-13C are detailed views of an exemplary isolation sub. In FIG. 13, an exemplary embodiment, isolation sub 1300 is operated according to methods known in the prior art. FIG. 13 provides a partial cutaway view of isolation sub 1300 including a metal casing 1310. Casing 1310 is configured to interface with the tubing or casing string, including via female interface 1314 and male interface 1312, which permit isolation sub 1300 to threadingly engage other portions of the tubing or casing string. Disposed along the circumference of casing 1310 is a plurality of ports 1320. In operation, ports 1320 are initially plugged with a retaining plug 1350 during the fracking operation, but ports 1320 are configured to open so that hydrocarbons can circulate through ports 1350 once production begins. Retaining plug 1350 is sealed with a O-ring 1340 and threadingly engages a port void 1380 (FIG. 13A). Sealed within retaining plug 1350 is a PGA plug 1360, sealed in part by plug O-rings 1370.

FIG. 13A is a cutaway side view of isolation sub. Shown particularly in this figure are bisecting lines A-A and B-B. Disposed around the circumference of casing 1310 are pluralities of port voids 1380, which fluidly communicate with the interior of casing 1310. Port voids 1380 are configured to threadingly receive retaining plugs 1350. A detail of port void 1380 is also included in this figure. As seen in sections A-A and B-B, two courses of port voids 1380 are included. The first course, including port voids 1380-1, 1380-2, 1380-3, and 1380-4 are disposed at substantially equal distances around the circumference of casing 1310. The second course, including port voids 1380-5, 1380-6, 1380-7, and 1380-8 are also disposed at substantially equal distances around the circumference of casing 1310 and are offset from the first course by approximately forty-five degrees.

FIG. 13B contains a more detailed side view of PGA plug 1360. In an exemplary embodiment, PGA plug 1360 is made of machined, solid-state high-molecular weight polyglycolic acid. In other embodiments, PGA plug 1360 may be machined. The total circumference of PGA plug 1360 may be approximately 0.490 inches. Two O-ring grooves 1362 are included, with an exemplary width between 0.093 and 0.098 inches each, and an exemplary depth of approximately 0.1 inches.

FIG. 13C contains a more detailed side view of a retaining plug 1350. Retaining plug 1350 includes a screw head to aid in mechanical insertion of retaining plug 1350 into port void 1380 (FIG. 13A). Retaining plug 1350 also includes threading 1356, which permits retaining plug 1350 to threadingly engage port void 1380. An O-ring groove 1352 is included to enable plug aperture 1358 to securely seal into port void 1380. A plug aperture 1358 is also included to securely receive a PGA plug 1360. In operation, isolation sub 1300 is installed in a well casing or tubing. After the fracking operation is complete, PGA plugs 1360 will break down in the pressure and temperature environment of the well, opening ports 1320. This will enable hydrocarbons to circulate through ports 1320.

Figure 14:
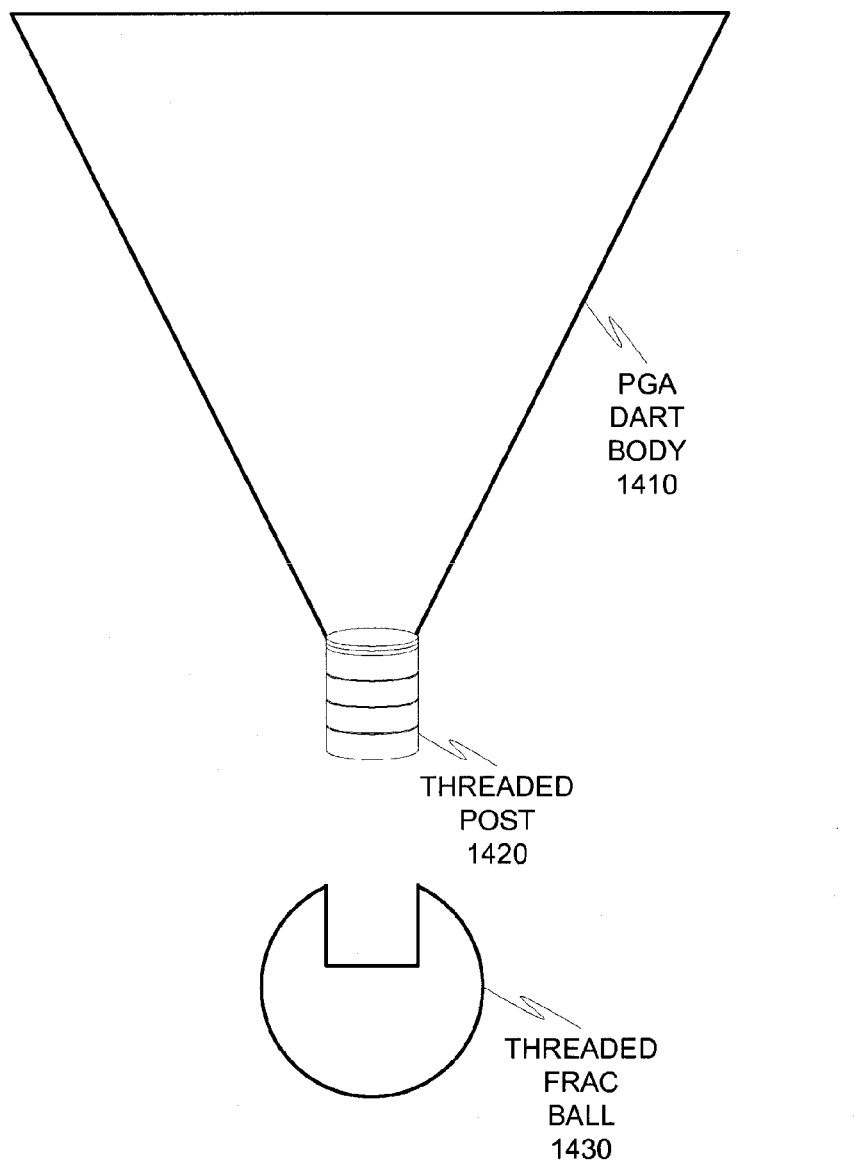
FIG. 14 is a cutaway side view of a PGA pumpdown dart.

FIG. 14 is a side view of an exemplary embodiment of a pumpdown dart 1400. In an exemplary embodiment, pumpdown dart 1400 is operated according to methods known in the prior art. In particular, pumpdown dart 1400 may be used in horizontal drilling applications to properly insert tools that may otherwise not properly proceed through the casing. Pumpdown dart 1400 includes a PGA dart body 1410, which is a semi-rigid body configured to fit tightly within the casing. In some embodiments, a threaded post 1420 is also provided, which optionally may also be made of PGA material. Some applications for threaded post 1420 are known in the art. In some embodiments, threaded post 1420 may also be configured to interface with a threaded frac ball 1430. Pumpdown dart 1400 may be used particularly in horizontal drilling operations to ensure that threaded frac ball 1430 does not snag or otherwise become obstructed, so that it can ultimately properly set in a valve seat.

Advantageously, pumpdown dart 1400 permits threaded frac ball 1410 to be seated with substantially less pressure and fluid than is required to seat PGA frac ball 110.

The specific gravity of the balls tested was about 1.50. They were machined to tolerances held at about ±0.005 inches. Kuredux® PGA balls were field tested at a pump rate of 20 barrels per minute and exhibited high compressive strength, but relatively fast breakdown into environmentally friendly products.

Figure 15:
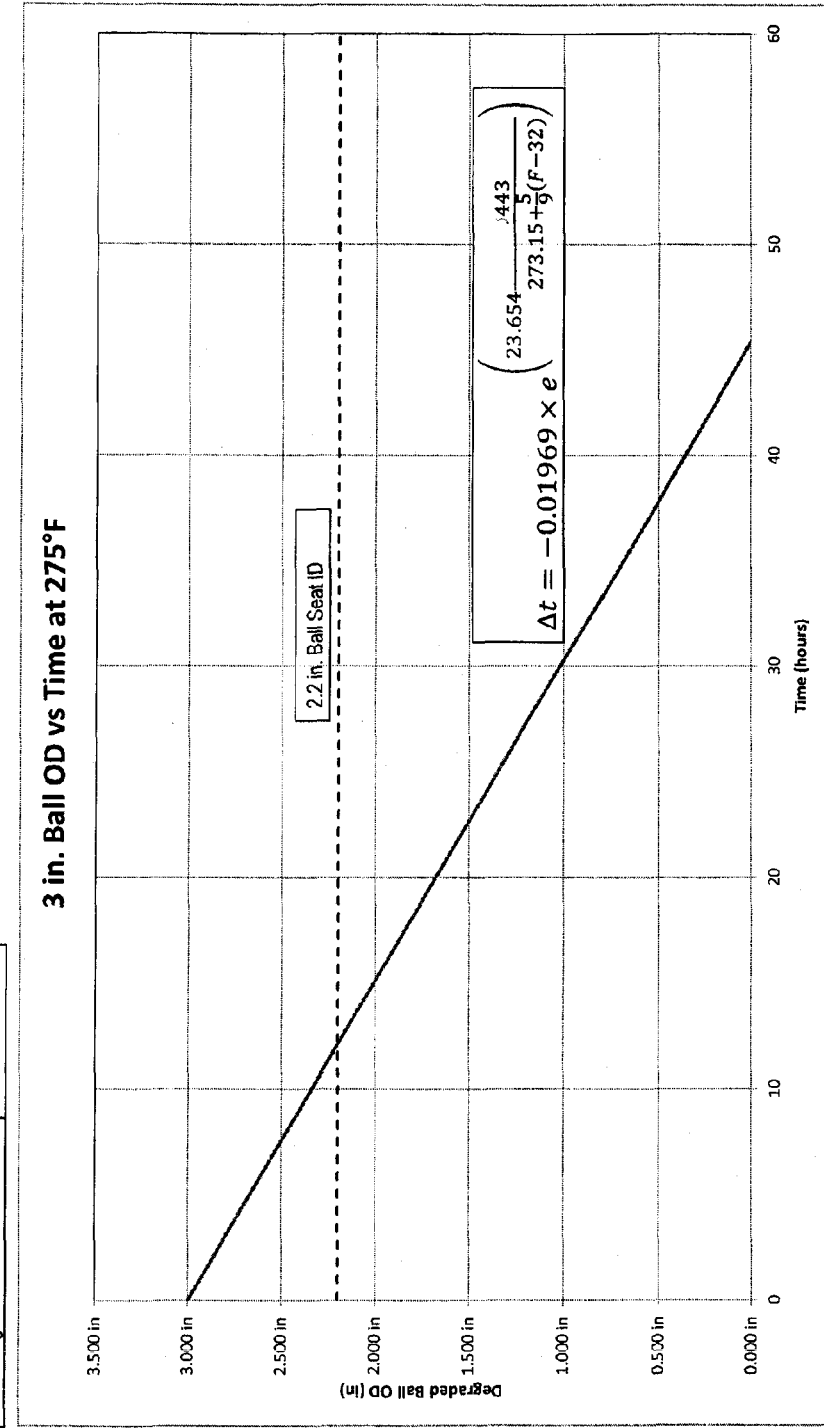
FIG. 15 illustrates a time/temperature test graph results for a 3 inch OD PGA ball at 275° F.

FIG. 15 illustrates the ball degradation rate of a 3 inch OD PGA frac ball versus time at 275° F., the PGA ball made from 100 R60 Kuredux® PGA resin according to the teachings set forth herein. The 3 inch ball is set on a 2.2 inch ball seat ID and passes the ball seat at about 12 or 13 hours.

Figure 16:
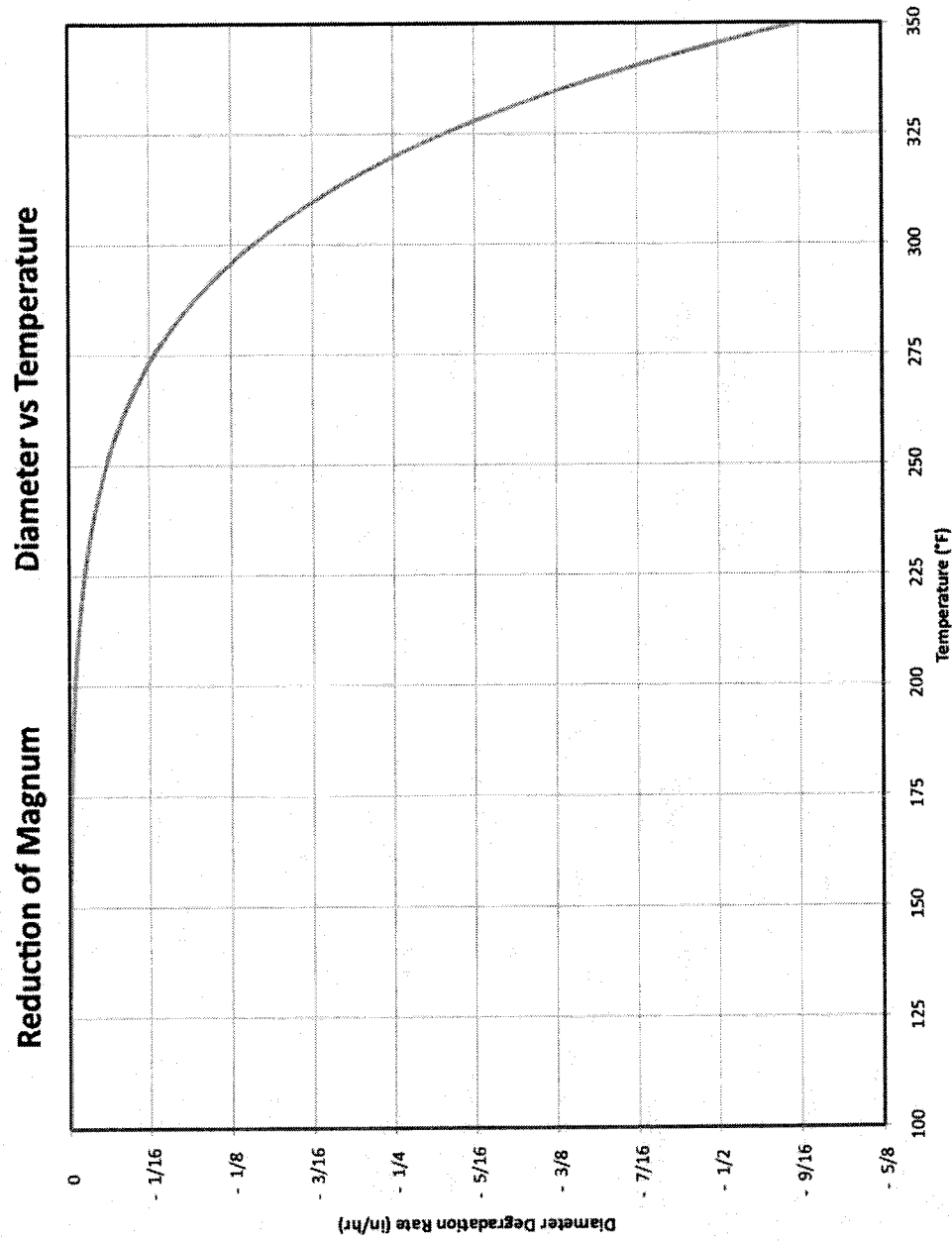
FIG. 16 illustrates reduction of the Magnum PGA ball in diameter in inches per hour at temperatures from 100° F. to 350° F.

FIG. 16 illustrates the reduction in ball diameter versus temperature. Reduction in ball diameter increases as temperature increases. Noticeable reduction in diameter is first apparent at about 125° F. More significant reduction in diameter begins at 175-200° F.

Figure 17:
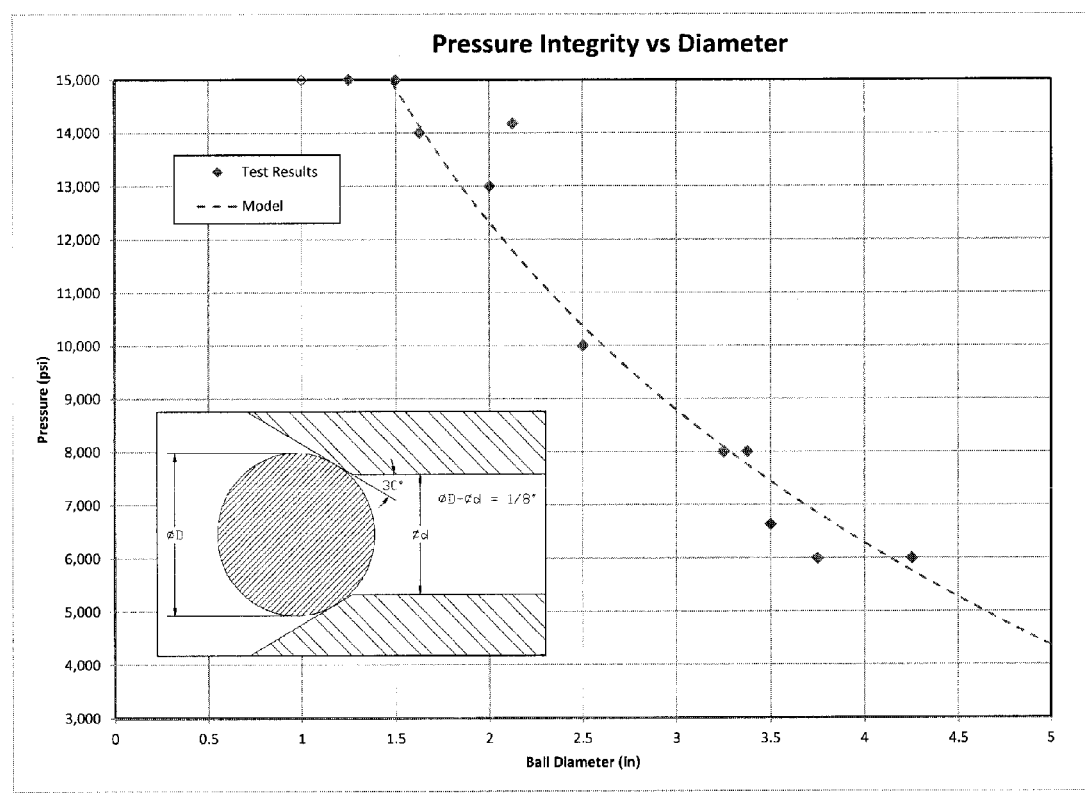
FIG. 17 illustrates an integrity versus diameter for Applicant's PGA balls, subject to pressures between 3000 to 15,000 pounds, ball diameters 1.5 to 5 inches.

FIG. 17 shows a pressure integrity versus diameter curve illustrating pressure integrity of PGA frac balls for various ball diameters. It illustrates the structural integrity, that is, the strength of Kuredux® PGA resin balls beginning with a ball diameter of about 1.5 inches and increasing to 5 inches as tested on seats which are each ⅛-inch smaller than each tested ball. The pressure testing protocol is illustrated in the examples below.

FRAC BALL EXAMPLE 1

A first test was performed with a 3.375 inch frac ball. Pressurizing was begun. Pressure was increased until, upon reaching 6633 psi, the pressure dropped to around 1000 psi.

Continued to increase pressure. The ball passed through the seat at 1401 psi. The 3.375 inch frac ball broke into several pieces after passing through the seat and slamming into the other side of the test apparatus.

FRAC BALL EXAMPLE 2

A second test was performed with a 2.125 inch frac ball. Pressurizing was begun. Upon reaching 10,000 psi, that pressure was held for 15 minutes. After the 15 minute hold, pressure was increased to take the frac ball to failure. At 14,189 psi, the pressure dropped to 13,304 psi. Continued to increase pressure until the ball passed through the seat at 14,182 psi.

FRAC BALL EXAMPLE 3

A third test was performed with a 1.500 inch frac ball. Pressurizing was begun. Upon reaching 10,000 psi, that pressure was held for 15 minutes. After the 15 minute hold, pressure was increased to 14,500 psi and held for 5 minutes. All pressure was then bled off. Did not take this ball to failure. Removing the ball from the seat took very little effort; it was removed by hand. Close examination of the frac ball revealed barely perceptible indentation where it had been seated on the ball seat.

Frac Ball Pressure Testing Weight Loss

After pressure testing, two different pieces of the 3⅜ inch frac ball were put into water and heated to try to degrade the pieces. The first piece weighed 140 grams. It was put into 150° F. water. After four days, the first piece weighed 120 grams.

The second piece weighed 160 grams. It was placed in 200° F. water. After four days, the second piece weighed 130 grams.

In one preferred embodiment, Applicant's PGA ball operates downhole from formation pressure and temperature to fracking pressures up to 15,000 psi and temperatures up to 400° F.

Figure 18:
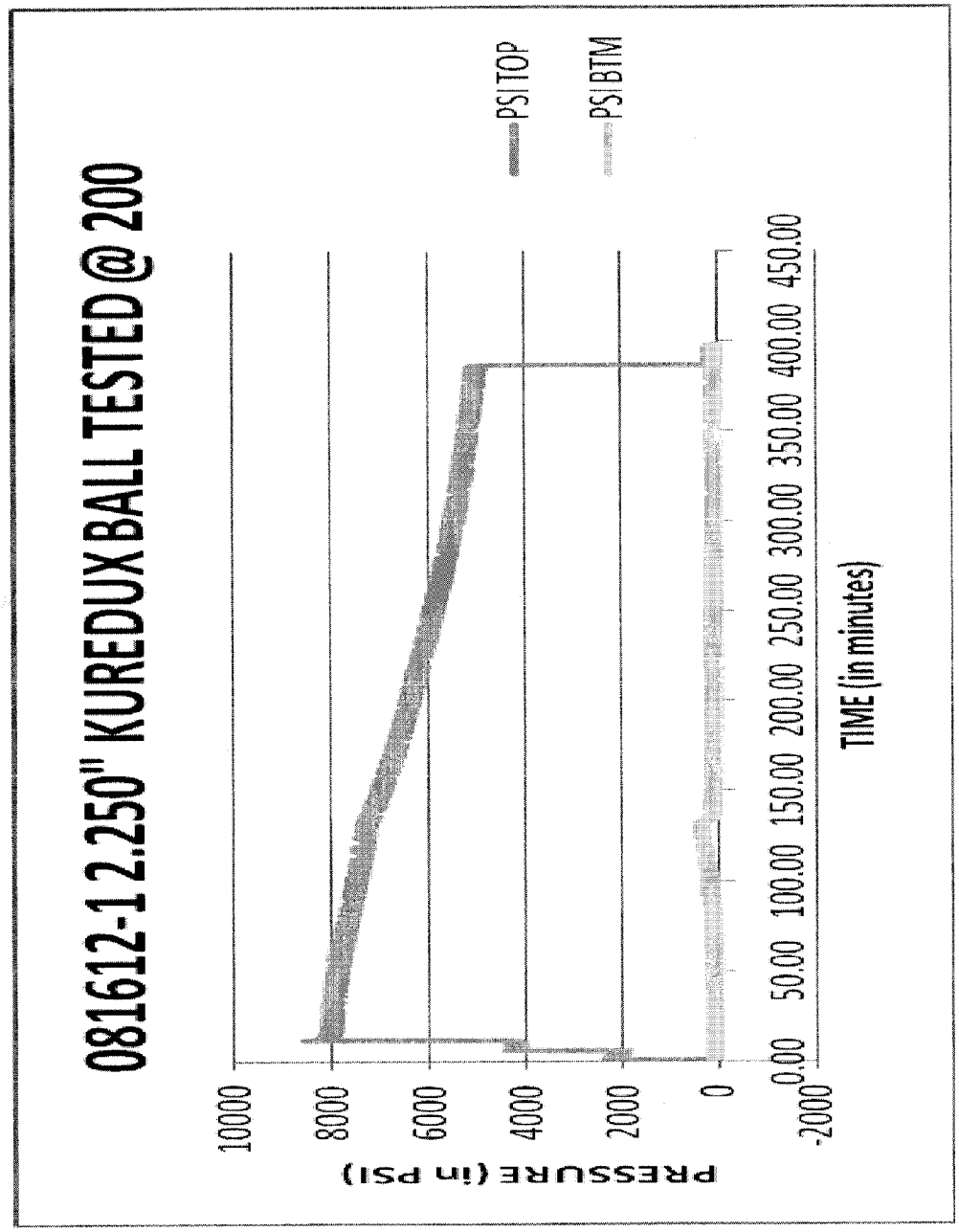
FIG. 18 is a time/pressure curve for Applicant's PGA ball to 0.25 inches in diameter taken to a pressure initially 8000 psi, held for 6 hours, and pressure released after 6 hours.

FIG. 18 illustrates pressure versus time test of a 2.25 inch PGA Kuredux® PGA resin ball at 200° F. and pressures up to 8000 indicating the period of time in minutes that the pressure was held. Psi at top and psi on bottom are both shown. The ball held at pressures between 8000 and about 5000 psi up to about 400 minutes. The test was run using a Maximater Pneumatic plunger-type, in a fresh water heat bath. The ball was placed in a specially designed ball seat housing at set temperature to 200° F. Pressure on the top side of the ball was increased at 2000 psi increments, each isolated and monitored for a 5 minute duration. Pressure was then increased on top side of the ball to 4000 psi, isolated and monitored for a 5 minute duration. Pressure was increased on the top side of the ball to 8000 psi, isolated and monitored until failure. The assembly was then bled down. There was no sign of fluid bypass throughout the duration of the hold. The top side pressure decrease see in FIG. 18b was probably caused by the ball beginning to deteriorate and slide into the ball seat. Due to the minimal fluid volume above the ball in the test apparatus, pressure loss caused by this is evident. In contrast, a well bore has relatively infinite volume versus likely ball deformation. After 6 plus hours of holding pressure without failing, top side pressure was bled down and the test completed. The ball was examined upon removal from the ball seat. It had begun to deform and begun to take a more cylindrical shape, like the ball seat fixture. While it was intended to take the ball to failure, the testing was substantially complete after 6 hours at 5000+ psi.

Figure 19:
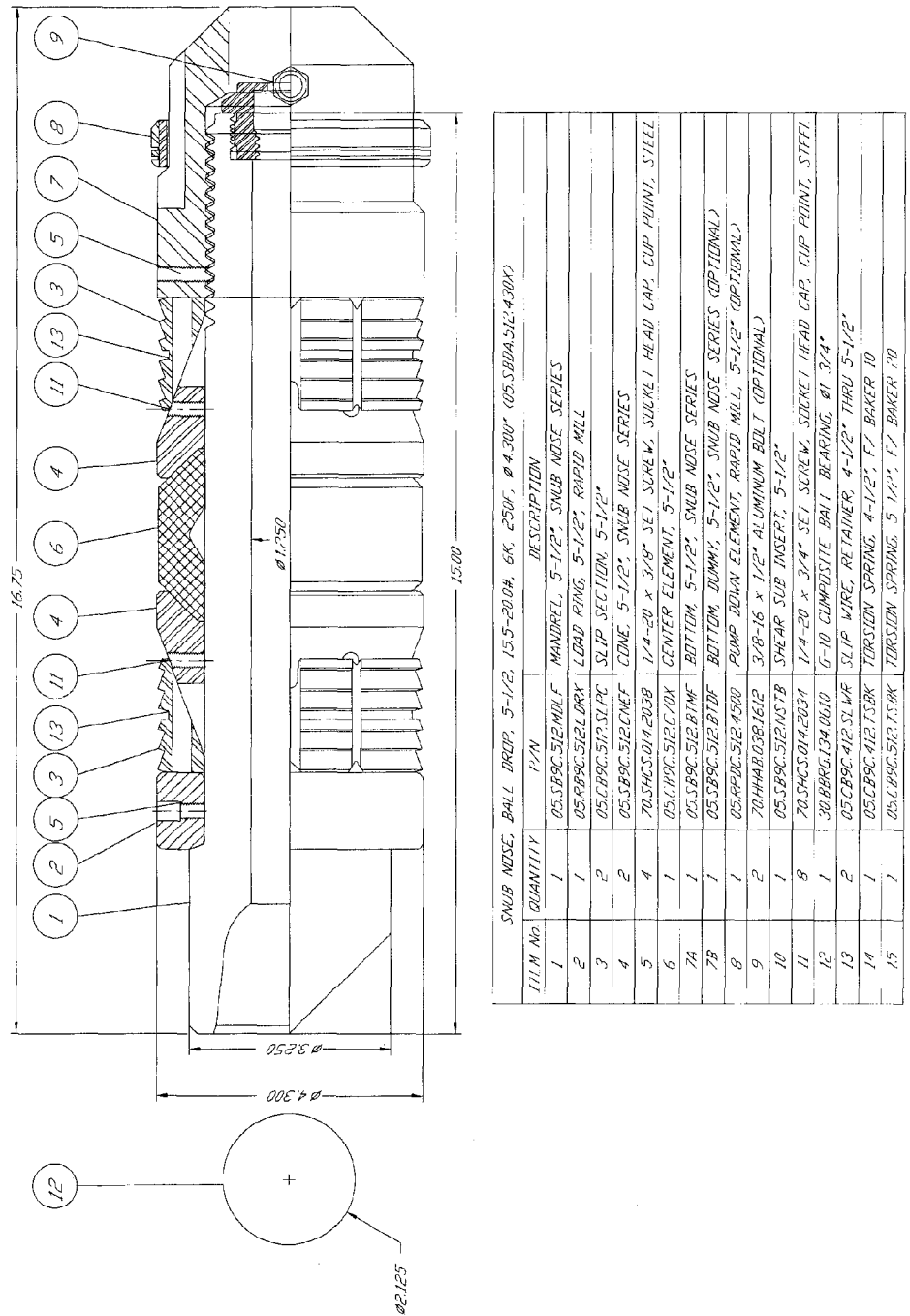
FIG. 19 is a side elevational view; partially cut away of a 5½ inch snub nose ball drop with items designated numbers 1 through 15 for that Figure only.

FIG. 19 illustrates a structural diagram of a 5½ inch snub nose ball drop valve with the item numbers listed as item number 1 to 15 for this Figure only.

5½ Inch Snub Nose Structural Integrity Test

A 5½ inch snub nose was tested in a 48 inch length tubing. The test used a single backoff element with bottom shear at 32,000 lbs. The PGA elements of this tool were: mandrel part 1, cones part 4, load ring part 2, and bottom part 7, the part numbers being as identified on FIG. 19 and being used for FIG. 19 only. A Maximater Pneumatic plunger-type pump was used with fresh water in a Magnum heat bath. The plug was set in a casing, and drop ball and pressure increased at top side to 5000 psi to ensure no leaks. Pressure was increased at top side to 6000 psi, isolated and monitored for 15 minutes. Pressure increased at top side to 8000 psi, isolated and monitored for 15 minutes. Pressure increased at top side to 10,000 psi, isolated and monitored for 20 minute duration. Bleed assembly pressure, all testing completed. The top slip engagement was 835.9 psi/6018 lbs. The bottom slip engagement was 1127 psi/8118 lbs. The plug shear, 4370 psi/31,469 lbs.

Once the plug was assembled and installed on the setting tube, it was lowered into the 5.5 inch, 20 lb. casing. The setting process then began. The plug was successfully set with a 31.5 1000 lb. shear. A ball was dropped onto the mandrel and the casing was pumped into the test console. Top side pressure was then increased to 5000 psi momentarily to check for leaks, either from the test fixture or the pressure lines. No leaks were evident and the top side pressure was then increased to 6500 psi for 15 minute duration. Pressure was then increased top side to 8000 psi for 15 minute duration. Upon completion of the 8000 psi hold, pressure was increased top side 10,000 psi for a 20 minute duration. Minimal pressure loss was evident on the top side of the plug. This is attributed to additional backoff in mandrel stroke due to the face that no sign of fluid bypass was evidence on the bottom side of the plug. Total fluid capacity of the casing was less than 2.5 USG, pressure loss evident top side at the plug totaled less than 1 cup. Assembly pressure was then bled down and testing was completed.

Upon removal of the test cap, there was no sign of eminent failure. The slips had broken apart perfectly and were fully engaged with the casing wall. There was also no sign of element extrusion or mandrel collapse. Everything performed as designed. Similar testing was done on a 4½ inch plug with similar results.

Set forth in FIGS. 1-14 and 19 above are various embodiments of down hole tools. In some embodiments of the above described plugs and in the ball drop bridge plug and snub nose bridge plug, there are at least the following elements: a mandrel, a cone, a top and bottom load ring, and a mule shoe or other structural equivalents, of which one or more of such structures may be made from the PGA or equivalent polymer disclosed herein. Other elements of the plugs typically not made from PGA, and made at least in part according to the teachings of the prior art are: elastomer elements, slips, and shear pins. Some prior art downhole tools, not made of PGA, must be milled out after use. This can cost time and can be expensive. For example, using PGA or its equivalent in the non-ball and, in some embodiments, non-seat, structural elements of the plugs, in addition to using a PGA ball if applicable, results in the ability to substantially forego milling out the plug after it is used. Due in part to PGA disintegration according to the teachings set forth herein, at the described time/temperature conditions, as well as in still fluid down hole conditions (substantially non-flow conditions), Applicant has achieved certain advantages, including functionally useful, relatively quick, degradability/disintegration of these PGA elements in approximately the same time, temperature, and fluid environmental conditions of Applicant's novel frac ball as set forth herein.

In one preferred embodiment of the down hole tool structural elements made from PGA substantially degrade to release the slips from the slip's set position in a temperature range of about 136° to about 334° F. in between one to twelve hours, in a substantially non-fluid flow condition. The fluid may be partially or substantially aqueous, may be a brine, may be basic or neutral, and may be at ambient pressure or pressures. Maximum pressure varies according to the structural requirements of the PGA element as shown by the pressure limitation curve of FIG. 17 and as can be inferred by its teaching. Increasing fracking pressures produce increasing downhole fluid temperatures. For example, 10,000 psi may produce a downhole fluid temperature of 350° F. and 15,000 psi produces a 400° F. temperature. No temperature is too high for the PGA or other degradable elements, it being understood that because degradation is temperature dependent, higher temperatures will cause degradation to being more quickly and for the degradable element to fall more quickly. Useful PGA frac ball diameters will decrease with increasing pressure. Duration from initiation of fracking until the PGA frac ball fails will decrease with increasing temperature and pressure. For example, after 91 days in fluid at 250° F., the PGA ball has degraded to less than 90% of its initial weight and has biodegradability equal to cellulose subjected to similar conditions. Taking these factors into account in choice of frac ball size, PGA frac balls for example, are useful for pressures and temperatures up to at least 15,000 pi and 400° F., it being understood that pressure and temperature effects are inversely related to the duration of time that the PGA frac ball must be exposed to the downhole fluid before it is sufficiently malleable and sufficiently deteriorated to pass through the seat. The PGA frac ball undergoes a change from a hard crystalline material to a malleable amorphous material and degrades or deteriorates, causing it to lose mass. These processes operate from the ball's outer surface inward. The pressure of fracking dramatically increases downhole fluid temperature and causes shearing stress on the conical portion of the ball abutting the seat. As these processes progress, they cooperate to squeeze the shrinking, more malleable ball through the seat. It is believed the described downhole tools comprised of the described materials will initially function as conventional downhole tools and then deteriorate as described herein. It is believed that the described several processes function together to accomplish the change from the hard frac ball blocking the well bore by sealing against the seat to the frac ball having passed through the seat and unblocking the well bore. At greater pressure and temperatures, deterioration occurs at a more rapid rate. Degradation produced by higher pressure and higher temperature for a shorter time is believed to be similar to degradation produced at a lower pressure and lower temperature for a longer time. These are deterministic processes which produce reliably repetitive and predictable results from similar conditions. The frac ball will pass through the seat at predictable times, given similar conditions. This is advantageous in field operations because it permits well production operations to be tightly and reliably scheduled.

Some prior art degradable downhole tool elements, upon dissolution, leave behind incrementally unfriendly materials, some in part due to the fluids used to degrade the prior art elements.

In downhole use of downhole tool elements comprised of PGA as described herein, the PGA elements initially accomplish the functions of conventional non-PGA elements and then the PGA elements degraded or disintegrated into non-toxic to humans and environmentally-friendly byproducts as described herein.

As set forth herein, when the above described downhole tool elements or other downhole tool elements comprised of PGA and its equivalents are placed within the above conditions, they will typically first perform their conventional downhole tool element function and then undergo a first breakdown. This first breakdown loosens and ultimately releases the non-PGA elements of the plug from the PGA elements of the plug. This includes release of the slips which press against the inner walls of the production tubing to hold the downhole tool in place. Release of the slips permits displacement of down hole tool through the well bore. Typically, continued downhole degradation then results in substantial breakdown of the PGA elements into materials which are non-toxic to humans and environmentally friendly compounds. For example, in typical down hole completion and production environments, and the fluids found therein, PGA will break down into glycerin, $CO_2$ and water. These are non-toxic to humans and environmentally friendly. The slips are usually cast iron, shear pins usually brass, and the elastomer usually rubber. However, they may be comprised of any other suitable substances. These elements are constructed structurally and of materials known in the prior art.

Some prior art downhole tool elements must be mechanically removed from the well bore, such as by milling them out or retrieving them. The described PGA element does not need to be mechanically removed. Some prior art downhole tool elements require a turbulent flow of fluid upon them for them to degrade or deteriorate. The described PGA elements degrade or deteriorate in the presence of still downhole fluid. The described PGA elements primarily only require the presence of a heated fluid to begin deteriorating. This is a substantial advantage for PGA-comprised downhole tool elements.

Some prior art degradable downhole tool elements require a high or low PH fluid or require a solvent other than typical downhole production fluid to promote degrading. The described PGA elements degrade or deteriorate in the presence of typical hot downhole production fluid and without the necessity of a high or low PH fluid or a solvent other than typical hot downhole production fluid. Fluids the described GPA material degrades in include hydrocarbons, water, liquid gas, or brine. In an embodiment, no other substances, for example, metals or ceramics, are mixed with the PGA in the element. PGA has been found to degrade in non-acidic oil, liquid gas, brine or any typical down hole fluid without needing a significant turbulent flow of the down hole fluid in the proximity of the structure element to begin the disintegration. It is especially useful that acidic fluids are not necessary for its disintegration.

This is advantageous because some prior art elements are primarily only quickly dissoluble down hole in the presence of a substantial flow of down hole fluid or in the presence of acidic fluids, conditions which require use of coiled tubing or other tool and activity to create conditions for degrading their elements. The disclosed embodiment is advantageously used to perform its mechanical functions and then degrade without further investment of time, tools or activity.

The PGA downhole elements described herein are advantageously stable at ambient temperature and substantially stable in downhole fluid at downhole fluid temperatures of up to about 136° F. PGA downhole elements begin to degrade or deteriorate in downhole fluid at downhole temperatures of above 136° F., and preferably in the range of from 150° F. to 300° F. Fracking operations pressurize the downhole fluid, and the higher pressures cause higher temperatures. Thus, the PGA element has the strength and incompressibility to be used as a conventional downhole tool element in a high pressure of fracking operation, and the high pressure of fracking causes the downhole fluid temperature to rise, which high downhole fluid temperature initiates degradation of the PGA element which allows production of the well without drilling out or retrieving the tool.

The predictable duration of time between PGA elements being immersed in the drilling fluid and the elements degrading is a useful function of the described element. The described PGA elements sufficiently degrade or deteriorate after their fracking function is completed so they fail their convention tool element function and production can proceed without being impeded by the elements remaining in the bore hole within about five hours to about two days. For example, a preferred time for PGA frac balls to fail by passing through their ball seat is from between about six hours to about two days. The time to failure is determinable from the teachings herein and experience.

Some prior art frac balls have sometimes stuck in their ball seat. The PGA frac ball does not stick in its ball seat.

In one aspect, a machinable, high molecular weight hydrocarbon polymer of compressive strength between 50 and 200 MPa (INSRON 55R-4206, compression rate 1 mm 1 min, PGA 10×10×4 (mm), 73° F. to 120° F.) may be used as the precursor or substrate material from which to make or prepare plug balls, mandrels, cones, load rings, and mule shoes or any of those parts degradable in typical downhole fluids in high pressure and temperature conditions. In another aspect, one or more of such elements of a downhole plug will decay faster than typical metallic such elements, typically within several days after being placed within the downhole environment. In a more specific aspect, the polyglycolic acid as found in U.S. Pat. No. 6,951,956, may be the polymer or co-polymer and used as the substrate material, and may include a heat stabilizer as set forth therein. Polyglycolic acid and its properties may have the chemical and physical properties as set forth in the Kuredux® Polyglycolic Acid Technical Guidebook as of Apr. 20, 2012, and the Kuredux® PGA Technical Information (Compressive Stress) dated Jan. 10, 2012, from Kuhera Corporation, PGA Research Laboratories, a 34-page document. Both the foregoing Kuhera patent and the Kuredux® technical publications are incorporated herein by reference. Kuredux® PGA resin is certified to be a biodegradable plastic in the United States by the Biodegradable Plastics Institute and is a fully compostable material satisfying the ISO 14855 test protocol.

In a preferred embodiment, Applicant prepares the structural elements of downhole isolation tools comprising, without limit, the mandrel, load rings, cones, and mule shoes from Kuredux® 100R60 PGA resin. This is a high density polymer with a specific gravity of about 1.50 grams per cubic centimeter in an amorphous state and about 1.70 grams per cubic centimeter in a crystalline state, and a maximum degree of crystallinity of about 50%. In a preferred embodiment, the Kuredux® is used in pellet form as a precursor in a manufacturing process, which includes the steps of extruding the pellets under heat and pressure into a cylindrical or rectangular bar stock and machining the bar stock as set forth herein. In one embodiment of a manufacturing method for the structural elements that use the polymer and, more specifically, the PGA as set forth herein, extruded stock is cylindrically shaped and used in a lathe to generate one or more of the structural elements set forth herein.

The lathe may be set up with and use inserts of the same type as used to machine aluminum plug or down hole parts that are known in the art. The lathe may be set up to run and run to a depth of about 0.250 inches. The lathe may be set to run and run at an IPR of 0.020 inches (typically, 10-70% greater than used for aluminum), during the roughing process. The roughing process may run the PGA stock dry (no coolant) in one embodiment and at a spindle speed (rpm) and a feed rate that are adjusted to knock the particles into a size that resembles parmesan cheese. This will help avoid heat buildup during machining of the structural elements as disclosed herein.

In a finishing process, the IPR may be significantly reduced, in one method, to about 0.006 inches, and the spindle speed can be increased and the feed rate decreased.

In one or more aspects of this invention, the structural elements of the plug and the ball are made from a homogenous, non-composite (a non-mixture) body configured as known in the art to achieve the functions of a ball in one embodiment, a mandrel in another, support rings in another, and a mule shoe in another. This homogenous non-composite body may be a high molecular weight polymer and may be configured to degrade in down hole fluids between a temperature of about 136° F. and about 300° F. It may be adapted to be used with slip seals, elastomer elements, and shear pins, as structurally and functionally found in the prior art, and made from materials found in the prior art.

In certain aspects of Applicant's devices, the homogenous, non-composite polymer body will be stable at ambient temperatures and, at temperatures of at least about 200° F. and above, will at least partially degrade to a subsequent configuration that unblocks a down hole conduit and will further subsequently degrade into products harmless to the environment.

PGA is typically a substantial component of these structural elements and, in one embodiment, homogenous. Generally, it has tensile strength similar to aluminum, melts from the outside in, is non-porous, and has the crystalline-like properties of incompressibility. Although this disclosure uses specific PGA material and specific structural examples, it teaches use of materials which degrade or deteriorate in downhole conditions other than PGA, and outside the particular range of PGA. It further teaches that downhole tools of various structures, functions, and compositions, whether homogeneous or heterogeneous, may be usefully used within the scope of the disclosure to obtain the described useful results.

In one embodiment, heat stabilizers are added to the PGA or other substrate material to vary the range of temperatures and range of durations of the downhole tool's element's described functions. Greater downhole depths and fracking pressures produce greater downhole fluid temperatures. An operator may choose to use the described degradable elements, modified to not begin degrading as quickly or at as low a temperature as described herein. Addition of a heat stabilizer to the PGA or other substrate material will produce this desired result.

Although some of the described embodiments are homogenous, the downhole elements may be heterogeneous. Fine or course particles of other materials can be included in a substrate admixture. Such particles may either degrade more quickly or more slowly than the PGA or other substrate material to speed or slow deterioration of the downhole elements as may be appropriate for different downhole conditions and tasks. For example, inclusion of higher melting point non-degradable material in a PGA ball is expected to delay the ball's passage through the seat and delay the ball's deterioration. For example, inclusion of a heat stabilizer in a PGA ball is expected to delay the ball's passage through the seat and delay the ball's deterioration. For example, inclusion of materials which degrade at temperatures lower than temperatures at which PGA degrades or which degrade more quickly than PGA degrades is expected to speed a ball's passage through the seat and speed a ball's deterioration. These teachings are applicable to the other downhole elements described herein and to other downhole tools generally.

The predictable duration of time from the temperature initiated deterioration beginning to degrade the element sufficiently that it fails, cases to perform its conventional tool function, under given conditions as taught herein is advantageous in field operations. The degradable element's composition, shape, and size can be varied to obtain a reliable desired duration of time from temperature-initiated deterioration to tool failure. In an embodiment, there are one or more coatings on the element. These coatings may be used to predictably vary the time to the element's functional dissolution malleability and dissolution.

In specific embodiments, the structural elements set forth herein are configured to be made from a high molecular weight polymer, including repeating PGA monomers include the tools seen in FIGS. 1-14 or FIG. 19, or those set forth in Magnum Oil Tools International's Catalog, on pages C-1 through L-17, which are incorporated herein by reference.

While measured numerical values stated here are intended to be accurate, unless otherwise indicated the numerical values stated here are primarily exemplary of values that are expected. Actual numerical values in the field may vary depending upon the particular structures, compositions, properties, and conditions sought, used, and encountered. While the subject of this specification has been described in connection with one or more exemplary embodiments, it is not intended to limit the claims to the particular forms set forth. On the contrary, the appended claims are intended to cover such alternatives, modifications and equivalents as may be included within their spirit and scope.

The invention claimed is:

1. A downhole element comprising:
 a non-composite body configured to block a downhole conduit in an initial configuration, wherein the body is prepared from polyglycolic acid (PGA), wherein the PGA of the body in the initial configuration is a high molecular weight PGA having a density of about 1.9 g/cm$^3$ in a crystalline state with a maximum degree of crystallinity of about 50%, and wherein the body is stable in a dry condition at ambient temperature, and, when exposed to a downhole fluid having a temperature of at least about 136° F., the PGA will at least partially change to a subsequent amorphous configuration having a density of about 1.5 g/cm$^3$ that does not block the downhole conduit.

2. The downhole element of claim 1, wherein the body is prepared from polyglycolic acid (PGA) and at least partially disintegrates when exposed to a downhole fluid at a temperature of at least about 150° F.

3. The downhole element of claim 1, wherein the body is prepared from PGA, is spherical, and is in the range of between about 0.750 inches to about 4.625 inches in diameter.

4. The downhole element of claim 1, wherein the subsequent change in configuration, at least in part, results from a decrease in mass, which mass decrease is at least about 18% of the initial configuration within about 4 days of being exposed to a downhole fluid with a temperature of at least about 150° F.

5. The downhole element of claim 1, wherein the body is substantially biodegradable into glycerin and other environmentally non-toxic substances.

6. The downhole element of claim 1, wherein the body, in its initial configuration, can withstand compression of at least 6600 psi upon the body against a seat with a diameter about ⅛-inch smaller than the body.

7. The downhole element of claim 1, wherein the body is homogenous.

8. The downhole element of claim 1, wherein the body is prepared by machining PGA stock into the body.

9. The downhole element of claim 1, wherein the body is prepared by milling substrate PGA into the body.

10. An isolation sub for use in subterranean hydrocarbon recovery comprising:
 a rigid casing configured to interface with a casing or tubing string; and
 a plurality of ports disposed along the circumference of the casing, at least some of the ports having seated therein a retaining plug, at least some of the retaining plugs consisting essentially of high-molecular weight polyglycolic acid (PGA), wherein the high molecular weight PGA of the retaining plugs is a PGA having a density of about 1.9 g/cm$^3$ in a crystalline state, with a maximum degree of crystallinity of about 50%, and the high molecular weight PGA is capable of substantially degrading into an amorphous state having a density of about 1.5 g/cm$^3$ within one month of being immersed in downhole fluid with a temperature of at least 150° F.

11. The isolation sub of claim 10 wherein the ports are disposed along the circumference of the casing in a first course and a second course, each course containing a plurality of ports spaced substantially equidistant from one another, and the second course being offset at rotation angle from the first course.

12. The isolation sub of claim 11 wherein the rotation angle i s approximately 45 degrees.

13. The isolation sub of claim 10 wherein at least some of the retaining plugs include an O-ring for sealingly engaging the ports.

14. A method of recovering hydrocarbons with a degradable downhole tool comprising:
 inserting the tool into a well bore which has a downhole fluid, the tool including a primary structural member consisting essentially of high-molecular weight polyglycolic acid (PGA), wherein the high molecular weight PGA of the tool is a PGA having a density of about 1.70 g/cm$^3$ in a crystalline state, with a maximum degree of crystallinity of about 50%, and the high molecular weight PGA is capable of substantially degrading into an amorphous state having a density of about 1.5 g/cm$^3$ within one month of being immersed in the downhole fluid upon the downhole fluid having a temperature of at least 150° F.;
 pressuring the downhole fluid sufficiently to fracture a zone, the pressurized downhole fluid having a temperature of at least 150° F.; and
 allowing the primary structural member to substantially degrade in the downhole fluid of the well bore.

15. The method of claim 14, wherein the primary structural member has sufficient structural integrity to permit the tool to be usefully used in fracturing the zone and the primary structural member substantially disintegrates in the well bore within four days after being inserted into the well bore.

16. The method of claim 15, wherein the primary structural member is capable of substantially disintegrating within four days after being inserted into the well bore without being adjacent to fluid flow.

17. A method of recovering subterranean resources comprising:
  drilling a well bore;
  inserting into the well bore having a downhole fluid a tool containing a primary structural member consisting essentially of high-molecular weight polyglycolic acid (PGA), wherein the high molecular weight PGA of the tool is a PGA having a density of about 1.70 g/cm$^3$ in a crystalline state, with a maximum degree of crystallinity of about 50%, and the high molecular weight PGA is capable of substantially degrading into an amorphous state having a density of about 1.5 g/cm$^3$ within one month of being immersed in a downhole fluid with a temperature of at least about 150° F.;
  operating the tool in a downhole fluid having a temperature of at least about 150° F.; and
  allowing the primary structural member to substantially degrade in the well bore.

18. The method of claim 17 further comprising pumping an acid into the well bore to expedite dissolution of the tool.

19. The method of claim 17 further comprising pumping a base into the well bore to expedite dissolution of the tool.

20. The method of claim 17, wherein the primary structural member has sufficient structural integrity to permit the tool to be usefully used as if it were a conventional metallic such element hydraulic fracturing of a zone and the primary structural member substantially disintegrates in the well bore within four days after the hydraulic fracking operation is begun.

21. The method of claim 17, wherein the primary structural member is capable of substantially disintegrating in the well bore within four days after being inserted into the well bore without being adjacent to fluid flow.

22. A ball for use in a downhole tool having a substantially spherical shape and consisting essentially of high molecular weight polyglycolic acid (PGA), wherein the high molecular weight PGA of the ball is a PGA having a density of about 1.70 g/cm$^3$ in a crystalline state, with a maximum degree of crystallinity of about 50%, and the high molecular weight PGA is capable of substantially degrading into an amorphous state having a density of about 1.5 g/cm$^3$ within one month of being immersed in a downhole fluid of at least 150° F.

23. The ball of claim 22 wherein the ball has a diameter of between about 0.75 inches and about 4.625 inches.

24. A ball for use in a downhole tool, wherein the ball has a diameter of about 0.75 inches to about 4.625 inches, is stable in a dry condition at ambient temperature for at least one year, is capable of withstanding compression of the ball upon a seat with a diameter ⅛-inch smaller than the ball of at least about 6,600 psi without substantial ball deformation or cracking in a dry condition at ambient temperatures, and is capable of changing from a crystalline state having a density of about 1.9 g/cm$^3$ and a maximum degree of crystallinity of about 50% to an amorphous state having a density of about 1.5 g/cm$^3$ to be capable of passing through a seat ⅛-inch smaller than the ball within four days of being immersed in downhole fluid at a temperature of at least about 150° F.

25. The ball of claim 24 wherein the ball is capable of substantially degrading into non-toxic materials within about one month of being immersed in downhole fluid at a temperature of at least about 150° F.

* * * * *